(12) United States Patent
Bailey et al.

(10) Patent No.: US 10,989,835 B2
(45) Date of Patent: Apr. 27, 2021

(54) METHODS AND SYSTEMS FOR CALCULATING AND EVALUATING VALUE OF INFORMATION FOR RESERVOIR FLUID MODELS DERIVED FROM DFA TOOL DATA

(71) Applicant: Schlumberger Technology Corporation, Sugar Land, TX (US)

(72) Inventors: William J. Bailey, Somerville, MA (US); Benoit Couet, Belmont, MA (US); Peter Kaufman, Highlands Ranch, CO (US); Oliver C. Mullins, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 488 days.

(21) Appl. No.: 14/762,828

(22) PCT Filed: Jan. 13, 2014

(86) PCT No.: PCT/US2014/011243
§ 371 (c)(1),
(2) Date: Jul. 23, 2015

(87) PCT Pub. No.: WO2014/116454
PCT Pub. Date: Jul. 31, 2014

(65) Prior Publication Data
US 2015/0363520 A1 Dec. 17, 2015

Related U.S. Application Data

(60) Provisional application No. 61/756,812, filed on Jan. 25, 2013.

(51) Int. Cl.
*E21B 49/08* (2006.01)
*G01V 99/00* (2009.01)
(Continued)

(52) U.S. Cl.
CPC ............ *G01V 99/005* (2013.01); *E21B 49/00* (2013.01); *E21B 49/08* (2013.01); *E21B 49/087* (2013.01);
(Continued)

(58) Field of Classification Search
CPC .. G06F 17/5009; G01V 99/005; G01V 11/00; E21B 49/087; E21B 49/10; E21B 49/00; E21B 49/08; E21B 2200/22
(Continued)

(56) References Cited

U.S. PATENT DOCUMENTS 4,994,671 A * 2/1991 Safinya ................ E21B 47/113
250/255
6,230,101 B1 5/2001 Wallis
(Continued)

FOREIGN PATENT DOCUMENTS

WO 2014116454 A1 7/2014

OTHER PUBLICATIONS

Ang, James S. "A Graphical Presentation of an Integrated Capital Budgeting Model." The Engineering Economist 23.2 (1977). pp. 101-116.*
(Continued)

*Primary Examiner* — Kamini S Shah
*Assistant Examiner* — John E Johansen
(74) *Attorney, Agent, or Firm* — Trevor G. Grove

(57) ABSTRACT

A method for deriving VOI for a hydrocarbon-bearing reservoir fluid model based on DFA data ("true fluid model") versus an "incorrect fluid model" includes calculating first, second and third objective functions that are based on NPV(s) of simulated production by a reservoir simulator with different configurations. For the first objective function, the simulator is configured with the incorrect fluid model and control variables that are optimized to derive a first
(Continued)

group of control variable values. For the second objective function, the simulator is configured with the true fluid model and the first group of control variable values. For the third objective function, the simulator is configured with the true fluid model and control variables that are optimized to identify a second group of control variable values. The objective functions can be deterministic, or can include statistics that account for uncertainty. A visualization of such results with uncertainty is also described.

18 Claims, 17 Drawing Sheets

(51) Int. Cl.
 *G01V 11/00* (2006.01)
 *E21B 49/10* (2006.01)
 *E21B 49/00* (2006.01)
(52) U.S. Cl.
 CPC .............. *E21B 49/10* (2013.01); *G01V 11/00* (2013.01); *E21B 2200/20* (2020.05)
(58) Field of Classification Search
 USPC .......................................................... 703/10
 See application file for complete search history.

(56) References Cited

U.S. PATENT DOCUMENTS

| | | | |
|---|---|---|---|
| 7,183,778 B2* | 2/2007 | Homan | G01V 3/20 324/693 |
| 7,249,009 B2* | 7/2007 | Ferworn | E21B 49/087 703/10 |
| 7,512,543 B2* | 3/2009 | Raghuraman | G01V 11/00 705/7.28 |
| 2002/0100584 A1* | 8/2002 | Couet | E21B 43/00 166/250.15 |
| 2008/0040086 A1 | 2/2008 | Betancourt et al. | |
| 2009/0120690 A1 | 5/2009 | Phillips | |
| 2009/0235731 A1 | 9/2009 | Zuo et al. | |
| 2012/0053838 A1 | 3/2012 | Andrews et al. | |
| 2012/0145400 A1 | 6/2012 | Harrison et al. | |

OTHER PUBLICATIONS

Hy-Billiot, J., et al. "Getting the best from formation tester sampling." SPE Annual Technical Conference and Exhibition. Society of Petroleum Engineers, 2002. pp. 1-9.*
Ang, James S. "A Graphical Presentation of an Integrated Capital Budgeting Model." The Engineering Economist 23.2 (1977). pp. 101-116. (Year: 1977).*
Hy-Billiot, J., et al. "Getting the best from formation tester sampling." SPE Annual Technical Conference and Exhibition. Society of Petroleum Engineers, 2002. pp. 1-9. (Year: 2002).*
Hegstad, B. K., et al. "Rapid scenario and risk analysis for a complex gas field with large uncertainties." SPE Annual Technical Conference and Exhibition. Society of Petroleum Engineers, 2004. pp. 1-11. (Year: 2004).*
International Search Report for International Application No. PCT/US2014/011243 dated Apr. 29, 2014.
Raghuraman, B., Couët, B., Savundararaj, P., Bailey, W. J., & Wilkinson, D. J. (Oct. 1, 2003). Valuation of Technology and Information for Reservoir Risk Management. Society of Petroleum Engineers. doi:10.2118/86568-PA, pp. 307-315.
de Neufville, R., and Scholtes, S.: Flexibility in Engineering Design. MIT Press, 2011, ISBN 978-0-262-01623-0, ProQuest ebrary. Web. Jul. 22, 2015, pp. 152-153.

* cited by examiner (a) A ('truth') vs. B ('incorrect')

(b) A ('truth') vs. C ('actual')

| Sample Point | Values in $ x 10^6 | | | Vol x 10^6 (A-C) | 'Loss' x 10^6 (B-C) | Optimum CV's | | |
| --- | --- | --- | --- | --- | --- | --- | --- | --- |
| | SA | SB | SC | | | COMP | LRAT | WWCT |
| DFA Tool | 56.85 | n/a | n/a | n/a | n/a | 12 | 29,040 | 80.0% |
| Top Sample | n/a | $62.52 | $56.72 | $0.13 | $5.80 | 12 | 29,870 | 80.0% |
| Middle Sample | n/a | $68.74 | $55.02 | $1.83 | $13.72 | 12 | 28,270 | 80.0% |
| Bottom Sample | n/a | $80.47 | $50.35 | $6.50 | $30.12 | 12 | 10,470 | 80.4% |

FIG. 8

| Risk Aversion | | Value A, $x10^6$ | | | Cv's: $s_{[opt|DFA]}$ | | |
|---|---|---|---|---|---|---|---|
| $\lambda$ | Conf. | $F_A$ | $\mu_A$ | $\sigma_A$ | COMP | LRAT | WWCT |
| 0.0 | 50.0% | 62.01 | 62.01 | 40.17 | 12 | 29,810 | 0.800 |
| 0.5 | 69.1% | 39.10 | 59.18 | 40.17 | 12 | 20,890 | 0.808 |
| 1.0 | 84.1% | 16.21 | 56.37 | 40.16 | 12 | 27,610 | 0.840 |
| 1.5 | 93.3% | 4.14 | 27.36 | 15.48 | 12 | 6,688 | 0.800 |
| 2.0 | 97.7% | -2.42 | 19.44 | 10.93 | 12 | 6,262 | 0.804 |

FIG. 13A  (a) A ('truth') vs. B ('incorrect')

FIG. 13B  (a) B ('truth') vs. C ('actual')

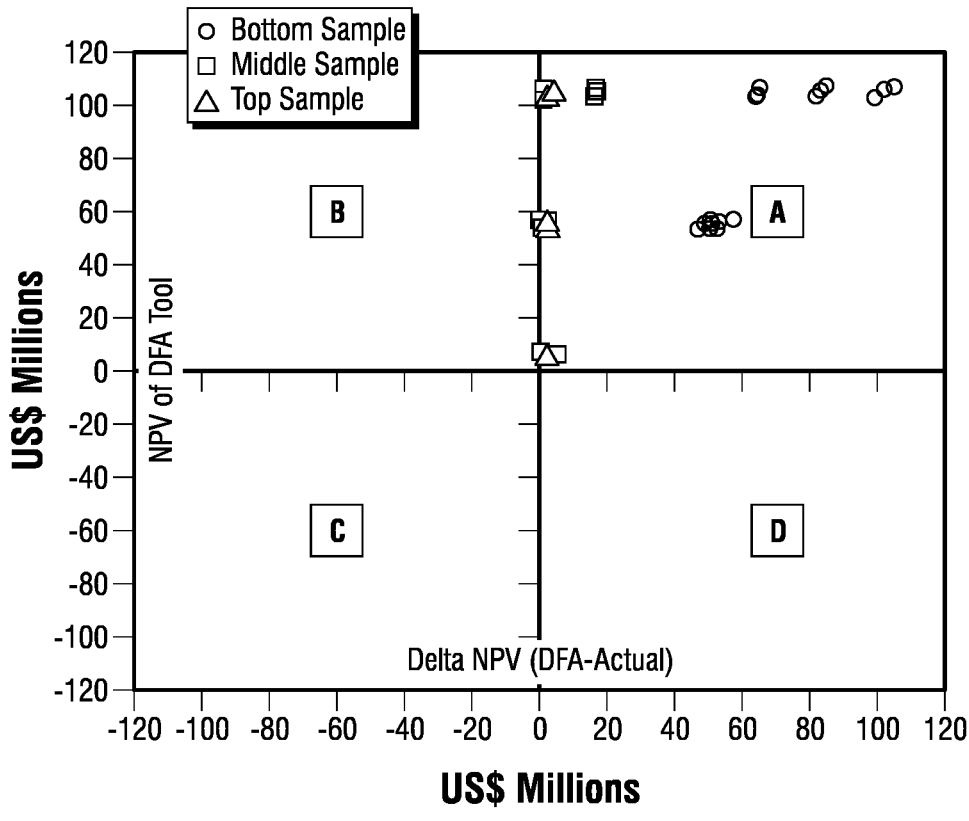

*FIG. 15A*

| Quadrant B ⟶ X ... DFA makes money (+'ve NPV) *but* the alternative makes *more* money than the DFA | Quadrant A ⟶ ✓ ... DFA makes *more* $'s than the alternative. This is the preferred quadrant to be located. |
|---|---|
| Quadrant C ⟶ X ... DFA loses money (-'ve NPV) *and* while the alternative loses money also, it loses *less* than the DFA | Quadrant D ... DFA loses money (-'ve NPV) *but* alternative loses *more* money than DFA (a somewhat 'neutral' region) |

*FIG. 15B*

METHODS AND SYSTEMS FOR CALCULATING AND EVALUATING VALUE OF INFORMATION FOR RESERVOIR FLUID MODELS DERIVED FROM DFA TOOL DATA

BACKGROUND

1. Field

The present application relates to methods and systems for calculating and evaluating value of information related to subterranean hydrocarbon-bearing reservoirs.

2. State of the Art

Downhole fluid sampling and analysis (DFA) of hydrocarbon-bearing reservoir fluids generates DFA tool data that can be used to derive a more accurate fluid model of the reservoir fluids as compared to other standard methodologies, such as single station sampling and follow-on fluid analysis. Value of Information (or VOI) is the amount a decision maker would be willing to pay for information prior to making a decision. The VOI of the DFA tool data is typically defined as the difference between the net present value (NPV) obtained from the DFA tool data ($NPV_a$) and the NPV obtained from the single-station fluid sampling model ($NPV_b$). In this case, the VOI of the DFA tool data is simply stated as:

$$VOI = NPV_a - NPV_b \qquad (1)$$

If the additional cost of obtaining the DFA data is given as $d_{DFA}$, then the net VOI can be calculated as:

$$\text{Net VOI} = (NPV_a - NPV_b) - d_{DFA}. \qquad (2)$$

The intrinsic flaw in the reasoning of Eqns. (1) and (2) is that it assumes that the values of $NPV_a$ and $NPV_b$ are agreed upon and uncontested. In truth, such agreement is not always likely, and thus there can be a situation where the very validity of underlying values of $NPV_a$ and $NPV_b$ are challenged. This situation may undermine the real value-adding potential of the DFA tool data.

SUMMARY

The present application provides a method of deriving information that characterizes value of a hydrocarbon-bearing reservoir fluid model data based on downhole fluid sampling and analysis operations, which includes:

i) providing or deriving a first fluid model that describes properties of the reservoir fluid as a function of location within the reservoir of interest, wherein the first fluid model is based on downhole fluid sampling and analysis operations;

ii) providing or deriving a second fluid model that describes properties of the reservoir fluid as a function of location within the reservoir of interest, wherein the second fluid model is based on fluid sampling and analysis operations that are different from the downhole fluid sampling and analysis operations from which the first fluid model is based;

iii) using a reservoir simulator configured with the second fluid model of ii) and a set of control variables, to simulate production of reservoir fluids from the reservoir of interest, and calculating at least one net present value of fluid production simulated by the reservoir simulator;

iv) deriving optimal values for the set of control variables of iii) by maximizing a first objective function that is based on at least one net present value of the reservoir fluid production simulated by the reservoir simulator in iii); and v) using the reservoir simulator configured with the first fluid model and the optimal values of the set of control variables as derived in iv), to simulate production of reservoir fluids from the reservoir of interest, and calculating at least one net present value of reservoir fluid production simulated by the reservoir simulator; and vi) performing calculations involving a second objective function that is based on the at least one net present value of reservoir fluid production simulated by the reservoir simulator in v) in order to derive information that characterizes value of the first fluid model.

The method can include further operations as follows:

vii) using the reservoir simulator configured with the first fluid model and the set of control variables of iii), to simulate production of reservoir fluids from the reservoir of interest, and calculating at least one net present value of reservoir fluid production simulated by the reservoir simulator; and viii) deriving optimal values for the set of control variables of vii) by maximizing a third objective function that is based on at least one net present value of the reservoir fluid production simulated by the reservoir simulator in vii); and wherein the calculation of vi) involve results of the third objective function of viii).

In one embodiment, the first, second and third objective functions can be deterministic in nature and thus not take into account uncertainty. In this case, the first objective function can be based on a single net present value of the reservoir fluid production simulated by the reservoir simulator in iii), the second objective function can be based on a single net present value of the reservoir fluid production simulated by the reservoir simulator in v), and the third objective function is based on a single net present value of the reservoir fluid production simulated by the reservoir simulator in vii).

In another embodiment, the first, second and third objective functions can take into account uncertainty. In this case, a set of uncertainty parameters and corresponding values can be defined for use in the reservoir simulations of iii), v) and vii). The first objective function can be based on statistics of a plurality of net present values of the reservoir fluid production simulated by the reservoir simulator in iii) for a number of different combinations of values of the set of uncertainty parameters, the second objective function can be based on statistics of a plurality of net present values of the reservoir fluid production simulated by the reservoir simulator in v) for the number of different combinations of values of the set of uncertainty parameters, and the third objective function can be based on statistics of a plurality of net present values of the reservoir fluid production simulated by the reservoir simulator in vii) for the number of different combinations of values of the set of uncertainty parameters. The calculation of vi) can involve calculating a figure of merit based on results of the second objective function and results of the third objective function.

In one embodiment, the first, second and third objective functions can each have multiple instances based on different values of a risk aversion factor. For example, the first, second and third objective functions can each have the form $$F_\lambda = \mu_\lambda - \lambda \sigma_\lambda,$$

where $F_\lambda$ is the objective function for a specific value of a risk aversion factor $\lambda$, and $\mu_\lambda$, $\sigma_\lambda$ are the mean and standard deviations of the objective function, respectively, for the specific value of the risk aversion factor λ.

The method can include further operations as follows:

utilizing a downhole tool to perform downhole fluid sampling and analysis operations at multiple measurements stations within a wellbore that traverses the reservoir of interest in order to derive the first fluid model; and/or performing other fluid sampling operations and fluid analysis operations with respect to reservoir fluid of the reservoir of interest in order to derive the second fluid model, wherein the other fluid sampling operations and fluid analysis operations are different from the downhole fluid sampling and analysis operations from which the first fluid model is derived.

The other fluid sampling operations can be performed at a single measurement station within a wellbore that traverses the reservoir of interest.

In another aspect, a method of visualizing information that characterizes the value of a hydrocarbon-bearing reservoir fluid model based on downhole fluid sampling and analysis operations is provided, which includes:

i) defining a set of uncertainty parameters and associated values;

ii) calculating a first objective function based on net present value of reservoir fluid production simulated by a reservoir simulator configured with a first fluid model derived from downhole fluid sampling and analysis operations, wherein the first objective function is calculated for a number of different combinations of values for the set of uncertainty parameters defined in i);

iii) calculating a second objective function based on net present value of reservoir fluid production simulated by a reservoir simulator configured with data derived from alternative fluid sampling and analysis operations, wherein the second objective function is calculated for the number of different combinations of values for the set of uncertainty parameters defined in i);

iv) for each different combination of values for the set of uncertainty parameters defined in i), calculating a difference between the first objective function as calculated in ii) and the second objective function as calculated in iii); and v) generating a plot for visualizing the results of the calculating of iv), wherein the plot has four quadrants defined by the intersection of an x-axis and a y-axis that are orthogonal to one another, wherein the x-axis represents the difference between the first and second objective functions as calculated in iv) and the y-axis represents the value of the first objective function in the difference represented by the x-axis.

In one embodiment, the first objective function is based on net present value of reservoir fluid production simulated by the reservoir simulator configured with the first fluid model and a set of control variables that are optimized to derive a first group of optimal values for the set of control variables, and the second objective function is based on net present value of reservoir fluid production simulated by the reservoir simulator configured with the first fluid model and a second group of optimal values for the set of control variables. The second group of optimal values for the set of control variables can be derived by evaluating a third objective function. The third objective function can be based on net present value of reservoir fluid production simulated by the reservoir simulator configured with a second fluid model derived from the alternative sampling and fluid analysis operations.

The method can include further operations as follows:

outputting the plot generated in v) for display or printing.

The calculations and data processing operations of the methodology can be embodied as software modules executing on a computer processing system (e.g., workstation or a distributed data processing system such as a cluster or cloud computing environment).

BRIEF DESCRIPTION OF THE DRAWINGS

FIG. 8 is a table that presents a suite of results that are produced by workflow of FIGS. 4A and 4B and FIG. 5 for the reservoir model of FIGS. 6A to 6C and Tables C and D provided below.

FIG. 10 is a schematic diagram of the workflow of FIG. 9.

FIGS. 11, 12, 13A, 13B and 14 are diagrams that present the results of the analysis of the workflow of FIGS. 9 and 10 for the reservoir model of FIGS. 6A to 6C and Tables C and D provided below.

FIG. 15A presents a visual representation called a "Regret Plot" that is useful for interpreting the results of the workflow of FIGS. 9 and 10.

FIG. 15B is a table that describes how to interpret the "Regret Plot" of FIG. 15A.

DETAILED DESCRIPTION OF THE PREFERRED EMBODIMENTS

Figure 1A:
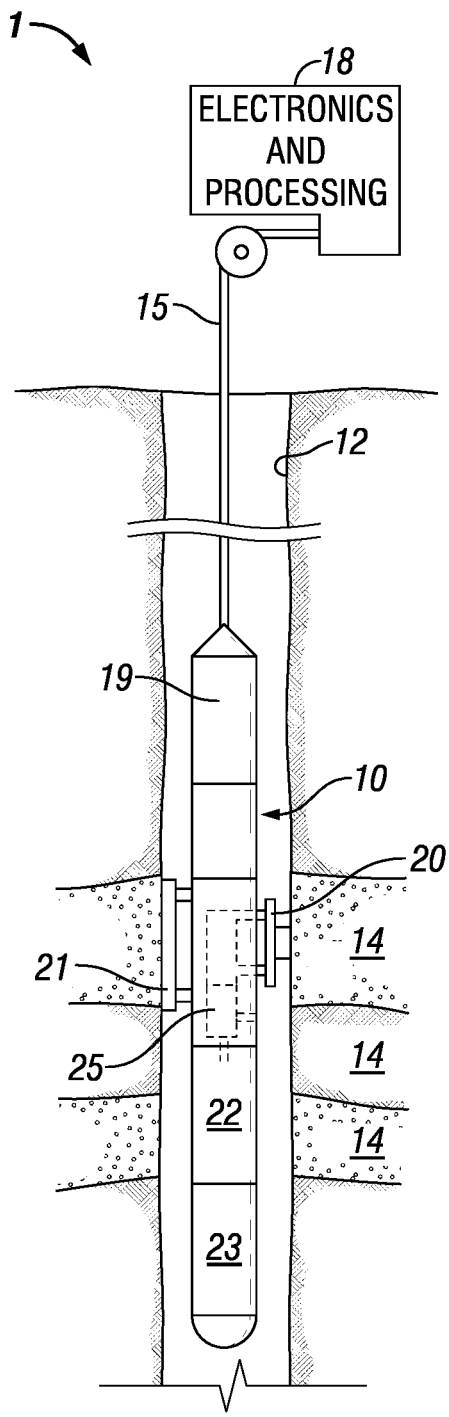
FIG. 1A illustrates an exemplary hydrocarbon-bearing reservoir analysis system.

FIG. 1A illustrates an exemplary hydrocarbon-bearing reservoir analysis system 1, which includes a borehole tool 10 suspended in the borehole 12 from the lower end of a typical multiconductor cable 15 that is spooled in a usual fashion on a suitable winch (not shown) on the surface. The cable 15 is electrically coupled to an electrical control system 18 on the surface. The tool 10 includes an elongated body 19 which carries a selectively extendable fluid admitting assembly 20 and a selectively extendable tool anchoring member 21 which are respectively arranged on opposite sides of the tool body. The fluid admitting assembly 20 is equipped for selectively sealing off or isolating selected portions of the wall of the borehole 12 such that fluid communication with the adjacent hydrocarbon-bearing reservoir 14 is established. The fluid admitting assembly 20 and tool 10 include a flowline leading to a fluid analysis module 25. The reservoir fluid obtained by the fluid admitting assembly 20 flows through the flowline and through the fluid analysis module 25. The fluid may thereafter be expelled through a port (not shown) or it may be sent to one or more fluid collecting chambers 22 and 23 which may receive and retain the fluids obtained from the reservoir 14. With the assembly 20 sealingly engaging the reservoir 14, a short rapid pressure drop can be used to break the mudcake seal. Normally, the first fluid drawn into the tool will be highly contaminated with mud filtrate. As the tool continues to draw fluid from the reservoir 14, the area near the assembly 20 cleans up and reservoir fluid becomes the dominant constituent. The time required for cleanup depends upon many parameters, including formation permeability, fluid viscosity, the pressure differences between the borehole and the reservoir, and overbalanced pressure difference and its duration during drilling. Increasing the pump rate can shorten the cleanup time, but the rate must be controlled carefully to preserve reservoir pressure conditions.

The fluid analysis module 25 includes means for measuring the temperature and pressure of the fluid in the flowline. The fluid analysis module 25 derives properties that characterize the reservoir fluid sample at the flowline pressure and temperature. In the preferred embodiment, the fluid analysis module 25 measures absorption spectra and translates such measurements into concentrations of several alkane components and groups in the fluid sample. In an illustrative embodiment, the fluid analysis module 25 provides measurements of the concentrations (e.g., weight percentages) of carbon dioxide ($CO_2$), methane ($CH_4$), ethane ($C_2H_6$), the $C_3$-$C_5$ alkane group, the lump of hexane and heavier alkane components (C6+), and asphaltene content. The $C_3$-$C_5$ alkane group includes propane, butane, and pentane. The $C_6^+$ alkane group includes hexane ($C_6H_{14}$), heptane ($C_7H_{16}$), octane ($C_8H_{18}$), nonane ($C_9H_{20}$), decane ($C_{10}H_{22}$), hendecane ($C_{11}H_{24}$)—also referred to as endecane or undecane, dodecane ($C_{12}H_{26}$), tridecane ($C_{13}H_{28}$), tetradecane ($C_{14}H_{30}$), pentadecane ($C_{15}H_{32}$), hexadecane ($C_{16}H_{34}$), etc. The fluid analysis module 25 also provides a means that measures live fluid density ($\rho$) at the flowline temperature and pressure, live fluid viscosity ($\mu$) at flowline temperature and pressure (in cp), reservoir pressure, and reservoir temperature.

Control of the fluid admitting assembly 20 and fluid analysis module 25, and the flow path to the collecting chambers 22, 23 is maintained by the control system 18. As will be appreciated by those skilled in the art, the fluid analysis module 25 and the surface-located electrical control system 18 include data processing functionality (e.g., one or more microprocessors, associated memory, and other hardware and/or software) to implement the workflow as described herein. The electrical control system 18 can also be realized by a distributed data processing system wherein data measured by the tool 10 is communicated (preferably in real time) over a communication link (typically a satellite link) to a remote location for data analysis as described herein. The data analysis can be carried out on a workstation or other suitable data processing system (such as a computer cluster or computing grid).

Reservoir fluids sampled by the tool 10 may be contaminated with mud filtrate. That is, the reservoir fluids may be contaminated with the filtrate of a drilling fluid that seeps into the reservoir 14 during the drilling process. Thus, when fluids are withdrawn from the reservoir 14 by the fluid admitting assembly 20, they may include mud filtrate. In some examples, fluids are withdrawn from the reservoir 14 and pumped into the borehole or into a large waste chamber (not shown) in the tool 10 until the fluid being withdrawn becomes sufficiently clean. A clean sample is one where the concentration of mud filtrate in the sample fluid is acceptably low so that the fluid substantially represents native (i.e., naturally occurring) reservoir fluids. In the illustrated example, the tool 10 is provided with fluid collecting chambers 22 and 23 to store collected fluid samples.

The system of FIG. 1A is adapted to make in situ determinations regarding hydrocarbon bearing reservoir by downhole sampling of reservoir fluid at one or more measurement stations within the borehole 12, conducting downhole fluid analysis of one or more reservoir fluid samples for each measurement station (including compositional analysis such as estimating concentrations of a plurality of compositional components of a given sample as well as other fluid properties), and relating the downhole fluid analysis to an equation of state (EOS) model of the thermodynamic behavior of the fluid in order to characterize the reservoir fluid at different locations within the reservoir. With the reservoir fluid characterized with respect to its thermodynamic behavior, fluid production parameters, transport properties, and other commercially useful indicators of the reservoir can be computed.

For example, the EOS model can provide the phase envelope that can be used to interactively vary the rate at which samples are collected in order to avoid entering the two-phase region. In other example, the EOS can provide useful properties in assessing production methodologies for the particular reservoir. Such properties can include density, viscosity, and volume of gas formed from a liquid after expansion to a specified temperature and pressure. The characterization of the fluid sample with respect to its thermodynamic model can also be used as a benchmark to determine the validity of the obtained sample, whether to retain the sample, and/or whether to obtain another sample at the location of interest.

Figure 1B:
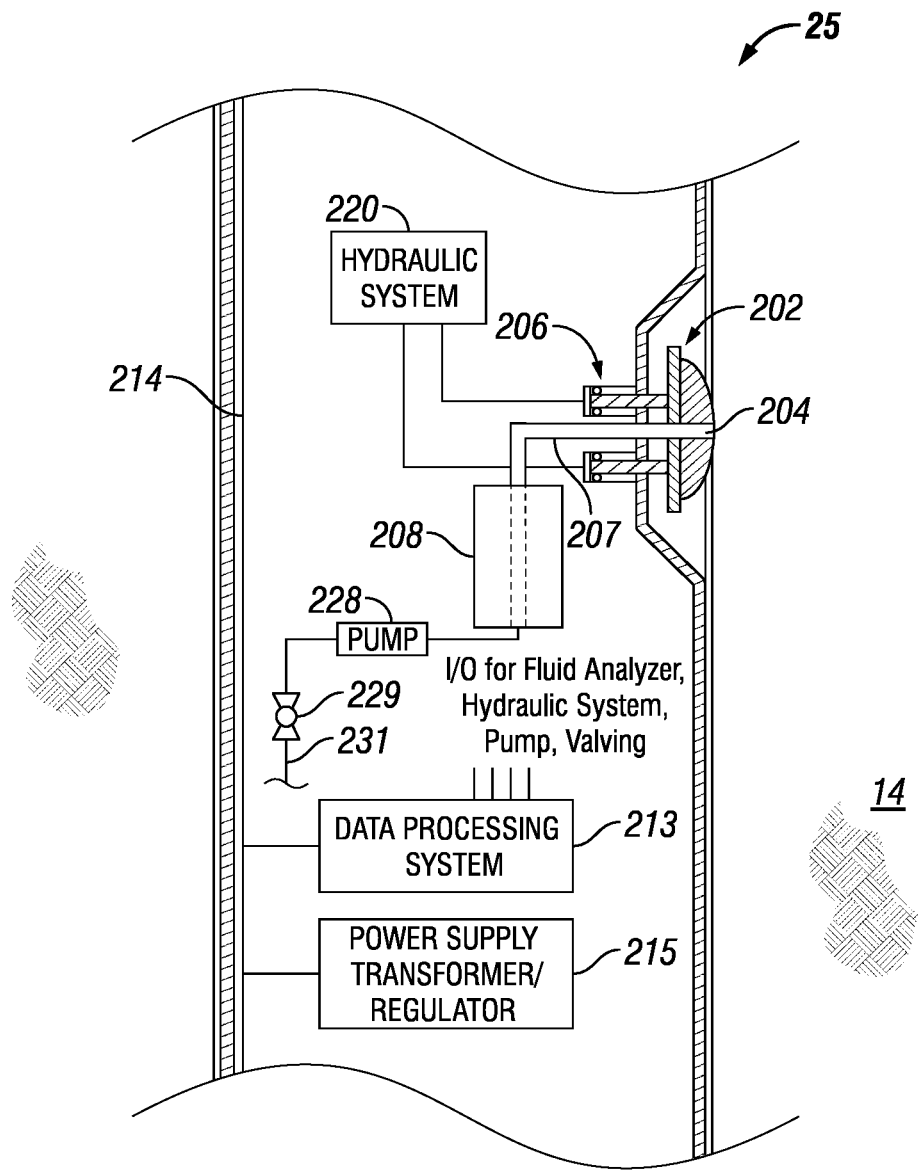
FIG. 1B illustrates an exemplary embodiment of the fluid analysis module of FIG. 1A.

FIG. 1B illustrates an exemplary embodiment of the fluid analysis module 25 of FIG. 1A (labeled 25'), including a probe 202 having a port 204 to admit reservoir fluid therein. A hydraulic extending mechanism 206 may be driven by a hydraulic system 220 to extend the probe 202 to sealingly engage the reservoir 14 (FIG. 1A). In alternative implementations, more than one probe can be used or inflatable packers can replace the probe(s) and function to establish fluid connections with the reservoir and sample fluid samples.

The probe 202 can be realized by the Quicksilver Probe sold commercially by Schlumberger. The Quicksilver Probe divides the fluid flow from the reservoir into two concentric zones, a central zone isolated from a guard zone about the perimeter of the central zone. The two zones are connected to separate flowlines with independent pumps. The pumps can be run at different rates to exploit filtrate/fluid viscosity contrast and permeability anistrotropy of the reservoir. Higher intake velocity in the guard zone directs contaminated fluid into the guard zone flowline, while clean fluid is drawn into the central zone. Fluid analyzers analyze the fluid in each flowline to determine the composition of the fluid in the respective flowlines. The pump rates can be adjusted based on such compositional analysis to achieve and maintain desired fluid contamination levels. The operation of the Quicksilver Probe efficiently separates contaminated fluid from cleaner fluid early in the fluid extraction process, which results in the obtaining clean fluid in much less time that compared to traditional reservoir testing tools.

The fluid analysis module 25' includes a flowline 207 that carries reservoir fluid from the port 204 through a fluid analyzer 208. The fluid analyzer 208 includes a light source that directs light to a sapphire prism disposed adjacent the flowline fluid flow. The reflection of such light is analyzed by a gas refractometer and dual fluoroscene detectors. The gas refractometer qualitatively identifies the fluid phase in the flowline. At the selected angle of incidence of the light emitted from the diode, the reflection coefficient is much larger when gas is in contact with the window than when oil or water is in contact with the window. The dual fluoroscene detectors detect free gas bubbles and retrograde liquid dropout to accurately detect single-phase fluid flow in the flowline 207. Fluid type is also identified. The resulting phase information can be used to define the difference between retrograde condensates and volatile oils, which can have similar GORs and live-oil densities. It can also be used to monitor phase-separation in real time and ensure single-phase sampling. The fluid analyzer 208 also includes dual spectrometers—a filter-array spectrometer and a grating-type spectrometer.

The filter-array spectrometer of the analyzer 208 includes a broadband light source providing broadband light that passes along optical guides and through an optical chamber in the flowline to an array of optical density detectors that are designed to detect narrow frequency bands (commonly referred to as channels) in the visible and near-infrared spectra as described in U.S. Pat. No. 4,994,671 to Safinya et al., herein incorporated by reference in its entirety. Preferably, these channels include a subset of channels that detect water-absorption peaks (which are used to characterize water content in the fluid) as well as a dedicated channel corresponding to the absorption peak of $CO_2$ with dual channels above and below this dedicated channel that subtract out the overlapping spectrum of hydrocarbon and small amounts of water (which are used to characterize $CO_2$ content in the fluid). The filter-array spectrometer also employs optical filters that provide for identification of the color (also referred to as "optical density" or "OD") of the fluid in the flowline. Such color measurements supports fluid identification, determination of asphaltene content and PH measurement. Mud filtrates or other solid materials generate noise in the channels of the filter-array spectrometer. Scattering caused by these particles is independent of wavelength. In the preferred embodiment, the effect of such scattering can be removed by subtracting a nearby channel.

The grating-type spectrometer of the analyzer 208 is designed to detect channels in the near-infrared spectra (preferably between 1600-1800 nm) where reservoir fluid has absorption characteristics that reflect molecular structure.

The analyzer 208 also includes a pressure sensor for measuring pressure of the reservoir fluid in the flowline 207, a temperature sensor for measuring temperature of the reservoir fluid in the flowline 207, and a density sensor for measuring live fluid density of the reservoir fluid in the flowline 207. In the preferred embodiment, the density sensor is realized by a vibrating sensor that oscillates in two perpendicular modes within the fluid. Simple physical models describe the resonance frequency and quality factor of the sensor in relation to live fluid density. Dual-mode oscillation is advantageous over other resonant techniques because it minimizes the effects of pressure and temperature on the sensor through common mode rejection. In addition to density, the density sensor can also provide a measurement of live fluid viscosity from the quality factor of oscillation frequency. Note that live fluid viscosity can also be measured by placing a vibrating object in the fluid flow and measuring the increase in line width of any fundamental resonance. This increase in line width is related closely to the viscosity of the fluid. The change in frequency of the vibrating object is closely associated with the mass density of the object. If density is measured independently, then the determination of viscosity is more accurate because the effects of a density change on the mechanical resonances are determined. Generally, the response of the vibrating object is calibrated against known standards. The analyzer 208 can also measure resistivity and pH of fluid in the flowline 207. Pressure sensor(s) and/or temperature sensor(s) for measuring pressure and temperature of reservoir fluid drawn into the flowline 207 can also be part of the probe 202. In other exemplary implementations, the flowline sensors of the analyzer 208 may be replaced or supplemented with other types of suitable measurement sensors (e.g., NMR sensors, capacitance sensors, etc.).

A pump 228 is fluidly coupled to the flowline 207 and is controlled to draw reservoir fluid into the flowline 207 and possibly to supply reservoir fluid to the fluid collecting chambers 22 and 23 (FIG. 1A) via valve 229 and flowpath 231 (FIG. 1B).

The fluid analysis module 25' includes a data processing system 213 that receives and transmits control and data signals to the other components of the module 25' for controlling operations of the module 25'. The data processing system 213 also interfaces to the fluid analyzer 208 for receiving, storing and processing the measurement data generated therein. In one embodiment, the data processing system 213 processes the measurement data output by the fluid analyzer 208 to derive and store measurements of the hydrocarbon composition of fluid samples analyzed by the fluid analyzer 208, including flowline temperature;

flowline pressure;

live fluid density ($\rho$) at the flowline temperature and pressure;

live fluid viscosity ($\mu$) at flowline temperature and pressure;

concentrations (e.g., weight percentages) of carbon dioxide ($CO_2$), methane ($CH_4$), ethane ($C_2H_6$), the C3-C5 alkane group, the lump of hexane and heavier alkane components (C6+), and asphaltene content;

GOR; and possibly other parameters (such as API gravity, oil formation volume factor (Bo), etc.)

The fluid analysis module 25' also includes a tool bus 214 that communicates data signals and control signals between the data processing system 213 and the surface-located system 18 of FIG. 1A. The tool bus 214 can also carry electrical power supply signals generated by a surface-located power source for supply to the module 25', and the module 25' can include a power supply transformer/regulator 215 for transforming the electric power supply signals supplied via the tool bus 214 to appropriate levels suitable for use by the electrical components of the module 25'.

In one embodiment, fluid analysis module 25' is realized by the InSitu Fluid Analyzer commercially available from Schlumberger. Although the components of FIG. 1B are shown and described above as being communicatively coupled and arranged in a particular configuration, persons of ordinary skill in the art will appreciate that the components of the fluid analysis module 25' can be communicatively coupled and/or arranged differently than depicted in FIG. 1B without departing from the scope of the present disclosure. In addition, the example methods, apparatus, and systems described herein are not limited to a particular conveyance type but, instead, may be implemented in connection with different conveyance types including, for example, coiled tubing, wireline, wired-drill-pipe, and/or other conveyance means known in the industry.

Figure 2:
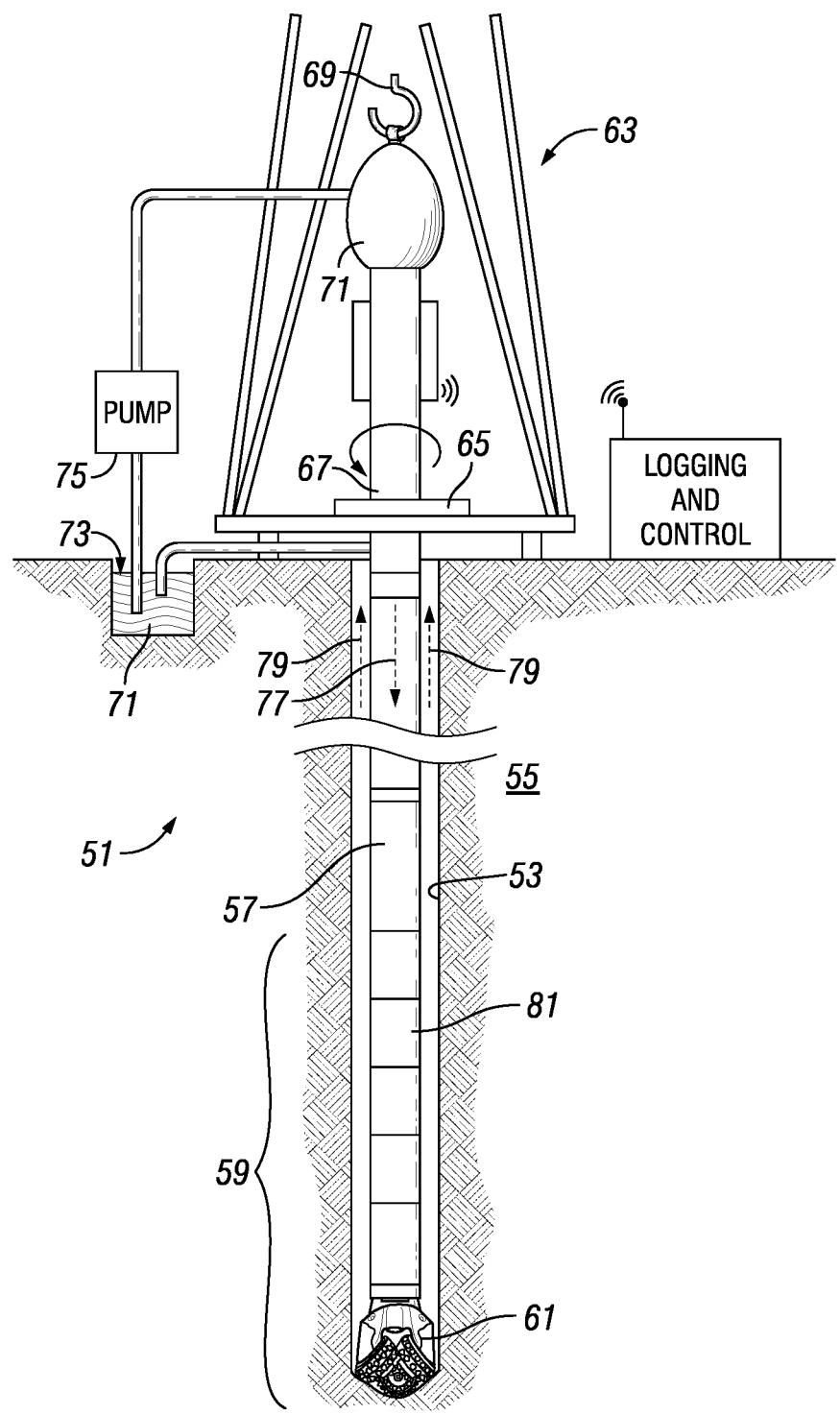
FIG. 2 illustrates another exemplary hydrocarbon-bearing reservoir analysis system

FIG. 2 illustrates another exemplary hydrocarbon-bearing reservoir analysis system 51. In this example system, a borehole 53 is drilled through the hydrocarbon-bearing reservoir 55 by rotary drilling in a manner that is well known in the art. In other exemplary systems, directional drilling apparatus and methods with hydraulic mud-motors and the like can be used. System 51 includes a drill string 57 is suspended within the borehole 53 and includes a bottom hole assembly ("BHA") 59 proximate the lower end thereof. The BHA 59 includes a drill bit 61 at its lower end. A platform and derrick assembly 63 is positioned over the borehole 53. The assembly 63 includes a rotary table 65, kelly 67, hook 69 and rotary swivel 71. The hook 69 is supported by a traveling block (not shown). The drill string 57 is rotated by the rotary table 65, which is itself operated by well-known means not shown in the drawing. The rotary table 65 engages the kelly 67 at the upper end of the drill string 57. The drill string 57 is suspended from the hook 59 by the rotary swivel 71. The drill string 57 passes through the kelly 67. The rotary swivel 71 which permits rotation of the drill string 57 relative to the hook 69. As is well known, a top drive system (not shown) could alternatively be used instead of the kelly 67 and rotary table 65 to rotate the drill string 57 from the surface. In the present example, the surface system further includes drilling fluid ("mud") 71 stored in a tank or pit 73 at the wellsite. A pump 75 delivers the drilling fluid 71 to the interior of the drill string 57 via a port in the swivel 71, causing the drilling fluid 71 to flow downwardly through the drill string 57 as indicated by the directional arrow 77, where it exits as water courses or nozzles ("jets") in the drill bit 61, and then circulates upwardly through the annulus region between the outside of the drill string and the wall of the borehole, as indicated by the directional arrows 79. In this well-known manner, the drilling fluid 71 lubricates the drill bit 61 and carries formation cuttings up to the surface, whereupon the drilling fluid is cleaned and returned to the tank/pit 71 for recirculation.

The bottom hole assembly 59 of the illustrated example can include a logging-while-drilling (LWD) module 81 and the drill bit 61. The LWD module 81 is housed in a special type of drill collar, as is known in the art, and can contain one or a plurality of known types of well logging instruments. The LWD module 81 typically includes capabilities for measuring, processing, and storing information, as well as for communicating with the surface equipment. In the present embodiment, the LWD module 81 includes a fluid analysis module as described above with respect to FIGS. 1A and 1B suitable for performing downhole fluid sampling and analysis.

Figure 3A:
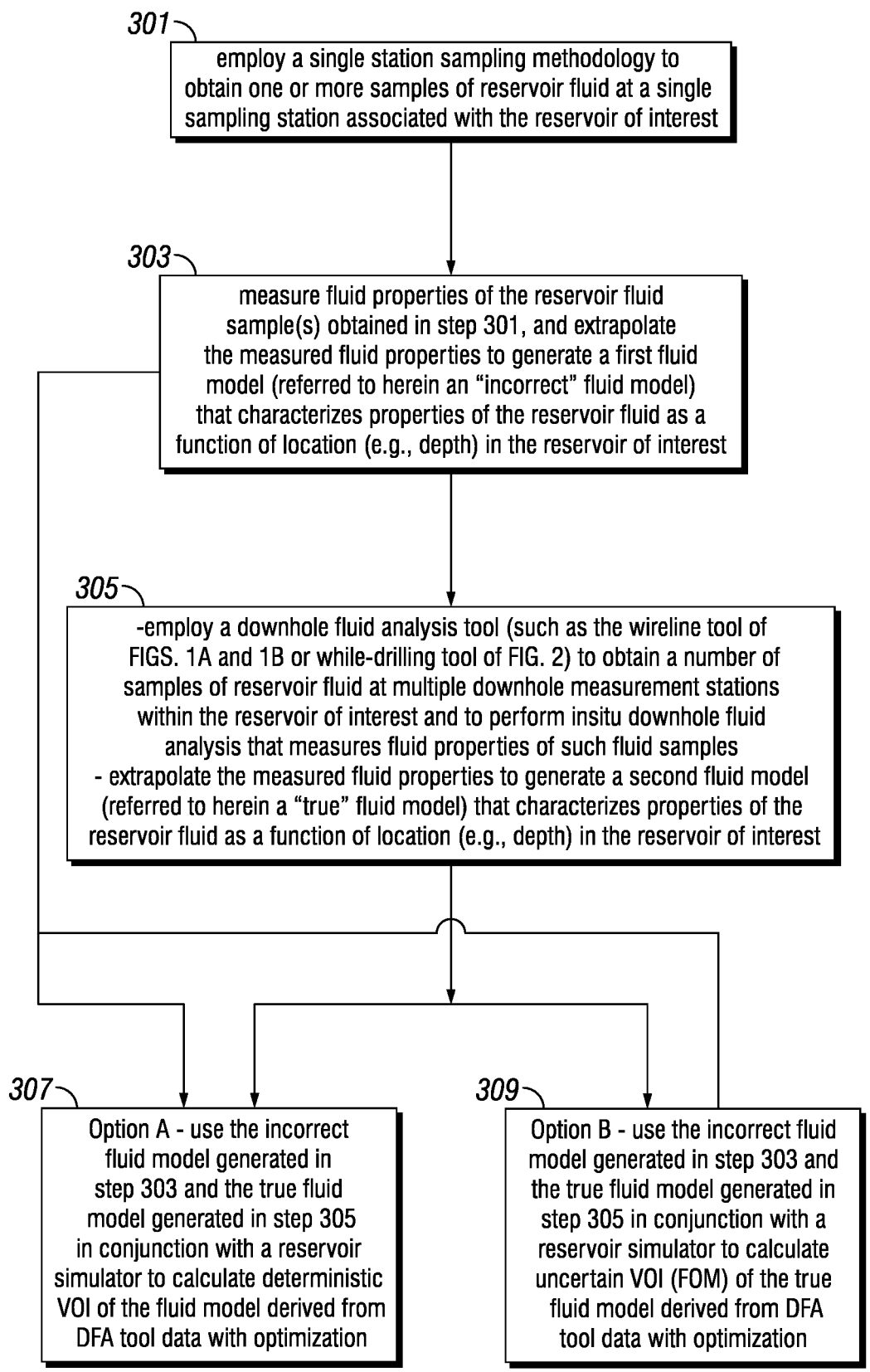
FIG. 3A is a flow chart that outlines a workflow to establish the VOI of a fluid model derived from DFA tool data as compared to the value of a fluid model derived from a single-station fluid sample.

In accordance with the present application, the system of FIGS. 1A and 1B and/or the system of FIG. 2 can be employed in conjunction with the methodology of FIG. 3A to quantify a value of information (VOI) for information that is derived from the in situ downhole fluid sampling and analysis of the reservoir fluids for a hydrocarbon-bearing reservoir of interest. FIG. 3A outlines a workflow to establish the VOI of a fluid model derived from downhole fluid analysis (DFA) tool data as compared to the value of a fluid model derived from a single-station fluid sample. Two distinct classes of approach are presented here. The first class is a deterministic approach that assumes that no reservoir uncertainty is present. The second class is an uncertain approach that assumes that reservoir uncertainty is present.

Deterministic VOI of a fluid model derived from downhole fluid analysis (DFA) tool data is straightforward and can be computed directly. However, when uncertainty is introduced into the analysis, a number of complexities are encountered that makes interpretation more involved. Nevertheless, for both cases, the key to the methodologies presented is optimization, which provides a solid foundation upon which the VOI metrics may be based.

The workflow of FIG. 3A begins in step 301 where a single station sampling methodology is carried out to obtain one or more samples of reservoir fluid at a single sampling station associated with the reservoir of interest. The single sampling station can be located at the surface, such as at a surface-located sampling manifold that is fluidly coupled to the annulus of the borehole 12 of FIGS. 1A and 1B or the borehole 53 of FIG. 2. The single sampling station can also be located or at or near the bottom of the borehole, at or near the middle of the borehole, or in some other suitable location in the borehole. In this case, the single station sampling methodology can employ a wireline or tubing conveyed sampling tool as is well known in the art.

Note that the sampling at depth within borehole attempts to capture samples close to reservoir conditions. In such sampling operations, adequate cleaning of near-wellbore regions and controlled drawdown are critical for obtaining uncontaminated representative samples and avoiding two-phase flow.

In step 303, fluid properties of the reservoir fluid sample(s) obtained in step 301 are measured. Such measurements typically involve bench-top fluid analysis experiments carried out in a laboratory setting. The fluid analysis experiments can include a constant-composition expansion test, a differential liberation test, a multistage-separator test or other tests necessary to describe the PVT behavior of the reservoir fluid. The measured fluid properties are then extrapolated to generate a first fluid model (referred to herein an "incorrect" fluid model) that characterizes properties of the reservoir fluid as a function of location (e.g., depth) in the particular reservoir of interest. The incorrect fluid model predicts chemical compositions of the reservoir fluid as well as physical properties of the reservoir fluid based on the chemical compositions. The predicted chemical compositions of the reservoir fluid can include component concentrations, molecular weight, molecular weight distribution, gas/oil ratios ("GOR"), combinations thereof, or the like. The predicted physical properties of the reservoir fluid can include macroscopic PVT properties (PVT behavior) of reservoir fluid including bubble point, dew point, phase envelope, viscosity, density, combinations thereof, and the like. The incorrect fluid model can employ equations of state (EOS) to represent the thermodynamic behavior of the reservoir fluid. Generally, the EOS fluid model uses a number of compositional components with a larger number of model parameters, such as critical properties (critical pressure, critical temperature, critical volume, and acentric factor- and several binary interaction coefficients) for each compositional component. In some embodiments, the user can select the EOS model from different types of EOS models, such as from one or more cubic EOS models such as the Redlich-Kwong-Soave EOS model or the Peng-Robinson EOS model. The user may also select a viscosity model from a number of choices, such as the Lohrenz, Bray, Clarke model or the Pedersen model. The user may also select the compositional components to incorporate into the EOS model. It is also possible for the EOS model to be tuned to match laboratory fluid data.

In step 305, a downhole fluid analysis tool (such as the wireline tool of FIGS. 1A and 1B or while-drilling tool of FIG. 2) is used to obtain a number of samples of reservoir fluid at multiple downhole measurement stations within the particular reservoir of interest and to perform in situ downhole fluid analysis that measures fluid properties of the reservoir fluid samples obtained at the multiple downhole measurement stations. The fluid properties of the reservoir fluid sample(s) obtained from the downhole fluid analysis are extrapolated to generate a second fluid model (referred to herein a "true" fluid model) that characterizes properties of the reservoir fluid as a function of location (e.g., depth) in the particular reservoir of interest. The true fluid model, like the incorrect fluid model, predicts chemical compositions of the reservoir fluid as well as physical properties of the reservoir fluid based on the chemical compositions. However, the true fluid model is more precise than the incorrect fluid model due to the DFA tool data. The predicted chemical compositions of the reservoir fluid of the true fluid model can include component concentrations, molecular weight, molecular weight distribution, gas/oil ratios ("GOR"), combinations thereof, or the like. The predicted physical properties of the reservoir fluid can include macroscopic PVT properties (PVT behavior) of reservoir fluid including bubble point, dew point, phase envelope, viscosity, density, combinations thereof, and the like. The true fluid model can employ equations of state (EOS) to represent the thermodynamic behavior of the reservoir fluid. Generally, the EOS fluid model uses a number of compositional components with a larger number of model parameters, such as critical properties (critical pressure, critical temperature, critical volume, and acentric factor- and several binary interaction coefficients) for each compositional component. In some embodiments, the user can select the EOS model from different types of EOS models, such as from one or more cubic EOS models such as the Redlich-Kwong-Soave EOS model or the Peng-Robinson EOS model. The user may also select a viscosity model from a number of choices, such as the Lohrenz, Bray, Clarke model or the Pedersen model. The user may also select the compositional components to incorporate into the EOS model. It is also possible for the EOS model to be tuned to match laboratory fluid data and/or downhole fluid analysis. Corrections for drilling fluid contamination may be necessary.

In step 307 (labeled option A), the incorrect fluid model generated in step 303 and the true fluid model generated in step 305 can be used in conjunction with a reservoir simulator to calculate deterministic VOI of the true fluid model with optimization. Details of such operations are described below with respect to FIGS. 4A and 4B and FIG. 5.

In step 309 (labeled option B), the incorrect fluid model generated in step 303 and the true fluid model generated in step 305 can be used in conjunction with a reservoir simulator to calculate uncertain VOI (which we refer to as a Figure of Merit or FOM) of a true fluid model derived from DFA tool data with optimization. Details of such operations are described below with respect to FIGS. 9 and 10.

The operations of steps 303 and 305 include data analysis operations that generate the incorrect fluid model and the true fluid model, and the operations of steps 307 and 309 employ a reservoir simulator that operates on a specified fluid model to simulate production of reservoir fluids from the particular reservoir of interest over a predetermined time period. The reservoir simulator employs a reservoir model that represents the physical space of the reservoir by an array of discrete cells, delineated by a grid which may be regular or irregular. The array of cells is usually three dimensional, although 1D and 2D models are sometimes used. Values for attributes such as porosity, permeability and water saturation are associated with each cell. The reservoir model typically includes the following information for the reservoir of interest:

Top reservoir surface, which can be a constant value or a complex surface interpolated from well markers and/or geophysics;

Base reservoir surface, which can be derived as an offset (constant or variable) from the top reservoir surface or a complex surface interpolated from well markers and/or geophysics;

Reservoir boundaries, which can be derived from bounding faults, pinchouts, designated extent, etc.

Rock and fluid properties such as porosity, permeability, relative permeabilies, water saturation, and net-to-gross ratio (which can be derived from inversion of seismic data and well logs and/or historical data).

The reservoir model also includes production data that models the development strategy for producing reservoir fluids from the reservoir of interest, which can include one or more production wells and/or injection wells (which can be vertical, horizontal, or deviated), associated well-connections, and associated operating parameters such as when and which wells are produced/injected at which rate, for how long, under which controls and other criteria related to the production process. The production data can include a set of control variables (e.g., see Table A below) that represent production processes and/or equipment (such as completion processes and/or equipment, enhanced recovery processes and/or equipment, etc.) and associated conditions that can be changed and/or updated over the simulated time period of production. The set of control variables and their associated values can be selected by the user, fixed by system design or defined in some other manner.

In one embodiment, the reservoir simulator utilizes the fluid model data to initialize the fluid properties of the grid cells of the reservoir model and then uses the production data of the reservoir model to derive and store the pressure and fluid saturations (e.g., volume fractions) for each grid cell of the reservoir model as well as the production of each phase (i.e., gas, oil, water) over a number of time steps. The reservoir simulator can carry out finite difference simulation, which is underpinned by three physical concepts: conservation of mass, isothermal fluid phase behavior, and the Darcy approximation of fluid flow through porous media. Thermal simulation (most commonly used for heavy oil applications) adds conservation of energy to this list, allowing temperatures to change within the reservoir. The PVT properties of the oil and gas phases of the reservoir fluids of the grid are fitted to an equation of state (EOS), as a mixture of components in order to dynamically track the movement of both phases and components in the reservoir of interest over time. Preferably, changes in saturation of three phases (gas, oil, and water) as well as pressure of each phase are calculated in each cell at each time step. For example, declining pressure in a reservoir will result in gas being liberated from the oil. In another example, increasing pressure in the reservoir (e.g., as a result of water or gas injection), gas is re-dissolved into the oil phase. Details of exemplary operations for carrying out the finite difference simulation are set forth in U.S. Pat. No. 6,230,101 to Wallis, commonly assigned to assignee of the present application and herein incorporated by reference in its entirety. Alternatively, finite element simulation techniques and/or streamline simulation techniques can be used by the reservoir simulator 120. as described above can fit the PVT properties of oil and gas phases to an equation of state (EOS) for a mixture of components.

Figure 3B:
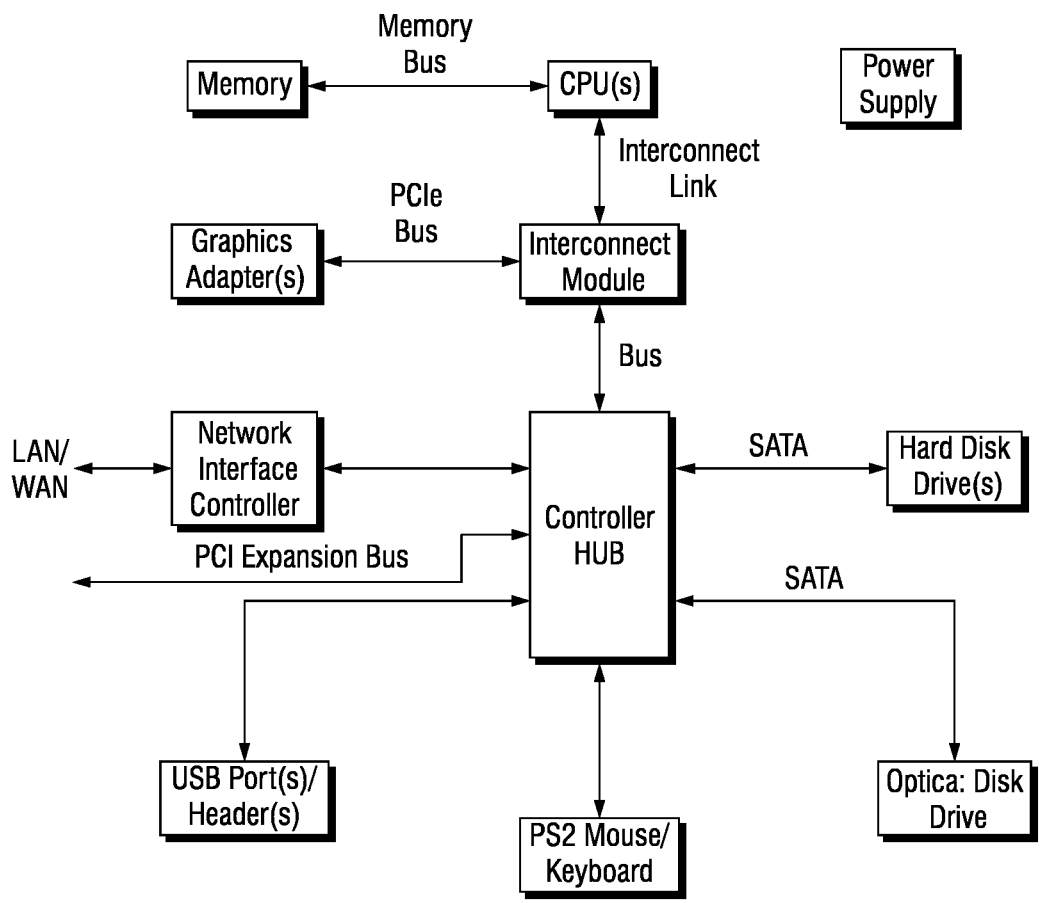
FIG. 3B is a schematic block diagram of a computer workstation.

In an exemplary embodiment, the data analysis operations of the workflow described herein (including steps 303 and 305 and/or the reservoir simulator of steps 307 and 309) are embodied as software modules executing on a computer workstation as shown in FIG. 3B. The software modules can be persistently stored in the hard disk drive(s) of the workstation and loaded into memory for execution by the CPU(s) of the workstation. In an alternate embodiment, the data analysis operations of the workflow can be embodied as software modules executing in a distributed computing environment (such as a computing cluster or grid) or in a cloud computing environment. In one embodiment, the reservoir simulator of steps 307 and 309 can be embodied by the ECLIPSE reservoir simulator of Schlumberger, assignee of the present application. Where optimization is required, the reservoir simulator can use the Aurum Optimization Library (AOL) as the optimization engine.

Figure 4A:
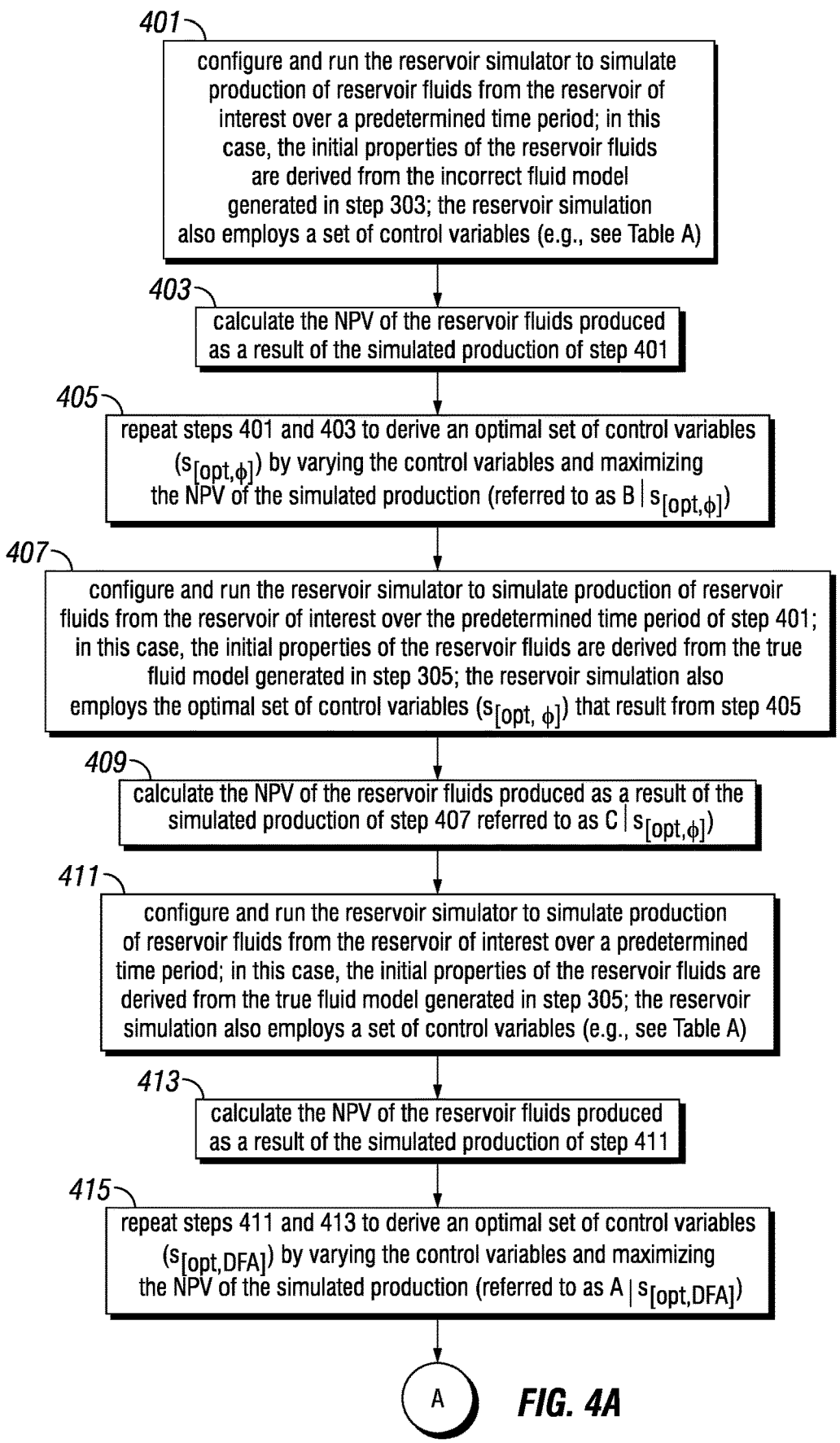
FIGS. 4A and 4B, collectively, is a flow chart that outlines a workflow to establish deterministic VOI of a fluid model derived from DFA tool data as compared to the value of a fluid model derived from a single-station fluid sample.
Figure 4B:
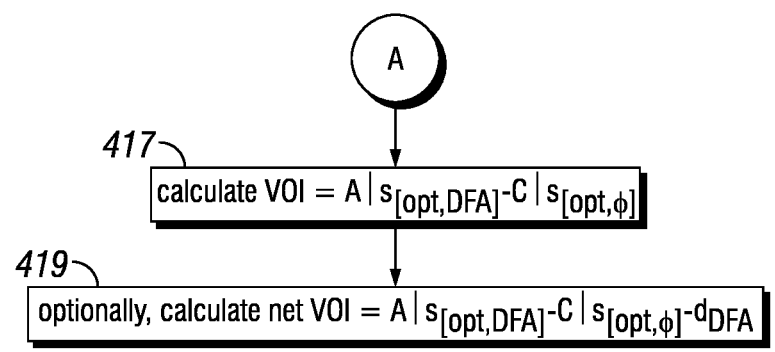

The workflow of FIGS. 4A and 4B begins in step 401 where the reservoir simulator is configured and run (executed) to simulate production of reservoir fluids from the particular reservoir of interest over a predetermined time period (for example, a two year time period). In step 401, the initial properties of the reservoir fluids (i.e., the PROPS section of the reservoir model as input to the reservoir simulator) are derived from the incorrect fluid model generated in step 303. In this case, the reservoir simulator employs a set of control variables that are optimized by the workflow (step 405). In one embodiment, the set of control variables can be defined by the parameters listed in table A below in conjunction with associated values as shown:

TABLE A

| Description | CV Name (units) | Guess | Lower Bound | Upper Bound |
|---|---|---|---|---|
| Lower Completion - the layer (defined by the index K) where the lower completion of the well should be placed; the upper completion is fixed at index K = 10 | comp (k-index) | 15 | 12 | 25 |
| Liquid Target Rate in Blpd (barrels of liquid per day) | LRAT (Blpd) | 12,500 | 100 | 30,000 |
| Economic Limit - defines the flowing water fraction (WWCT) at which the well is deemed uneconomic and should be shut-in | WWCT (fraction) | 0.95 | 0.8 | 1.0 |

In other embodiments, other suitable control variables can be used.

In step 403, the net-present-value (NPV) of the reservoir fluids produced as a result of the simulated production of step 401 is calculated. In one embodiment, the NPV of the reservoir fluids can take into account one or more of the parameters listed in table B below in conjunction with assigned values as shown:

TABLE B

| Parameter | Value |
|---|---|
| Oil Price | $60.00 USD/bbl |
| Gas Price | $4.00 USD/Mscf |
| Lift Cost | $21.00 USD/bbl (liquid) |
| Water Processing Cost | $4.50 USD/bbl (water) |
| Gas Processing Cost | $0.55 USD/Mscf |
| Oil Transport Cost | $1.00 USD/bbl |
| Fixed Costs | $20,000.00 USD/day |
| Initial CapEx (at t = 0 days) | $150 × $10^6$ USD |
| Discount Rate | 8% per year |
| Risk Free Rate | 4% per year | where Mscf = 1000 scf (standard cubic foot)
bbl = barrel

In other embodiments, other parameters can be used for calculating NPV of the simulated production.

In step 405, the operations of steps 401 and 403 are repeated for optimization of the set of control variables by varying the control variables in the range between their respective upper and lower bounds in order to maximize the NPV of the simulated production. The optimized set of control variables generated in step 405 (referred to as the optimum operating control strategy $s_{[opt,\phi]}$) and the NPV for this optimum operating control strategy (referred to as $Bls_{[opt,\phi]}$) are stored for subsequent access.

In step 407, the reservoir simulator is configured and run (executed) to simulate production of reservoir fluids from the particular reservoir of interest over the same predetermined time period of step 401. In step 407, the initial properties of the reservoir fluids (i.e., the PROPS section of the reservoir model as input to the reservoir simulator) are derived from the true fluid model generated in step 305. In this case, the reservoir simulator employs the optimized control variables defined by the optimum operating control strategy $s_{[opt,\phi]}$ as generated and stored in step 405.

In step 409, the NPV of the reservoir fluids produced as a result of the simulated production of step 407 is calculated and stored. In one embodiment, this NPV (referred to as $Cls_{[opt,\phi]}$) can take into account one or more of the parameters listed in table B above.

In step 411, the reservoir simulator is configured and run (executed) to simulate production of reservoir fluids from the particular reservoir of interest over the same predetermined time period of step 401. In step 411, the initial properties of the reservoir fluids (i.e., the PROPS section of the reservoir model as input to the reservoir simulator) are derived from the true fluid model generated in step 305. In this case, the reservoir simulator employs the same set of control variables of step 401 (for example, those listed in Table A).

In step 413, the NPV of the reservoir fluids produced as a result of the simulated production of step 411 is calculated and stored. In one embodiment, this NPV can take into account one or more of the parameters listed in table B above.

In step 415, the operations of steps 411 and 413 are repeated for optimization of the set of control variables by varying the control variables in the range between their respective upper and lower bounds in order to maximize the NPV of the simulated production. The optimized set of control variables generated in step 415 (referred to as the optimum operating control strategy $s_{[opt,DFA]}$) and the NPV for this optimum operating control strategy (referred to as $A|s_{[opt,DFA]}$) are stored for subsequent access.

In step 417, the deterministic VOI of the true fluid model with optimization is calculated as:

$$VOI = A|s_{[opt,DFA]} - C|s_{[opt,\phi]}, \quad (3A)$$

where $A|s_{[opt,DFA]}$ is calculated and stored in step 415, and $C|s_{[opt,\phi]}$ is calculated and stored in step 409.

In optional step 419, if the additional cost of obtaining the DFA data is given as $d_{DFA}$, then the net VOI can be calculated as:

$$\text{Net VOI} = (A|s_{[opt,DFA]} - C|s_{[opt,\phi]}) - d_{DFA} \quad (3B)$$

Figure 5:
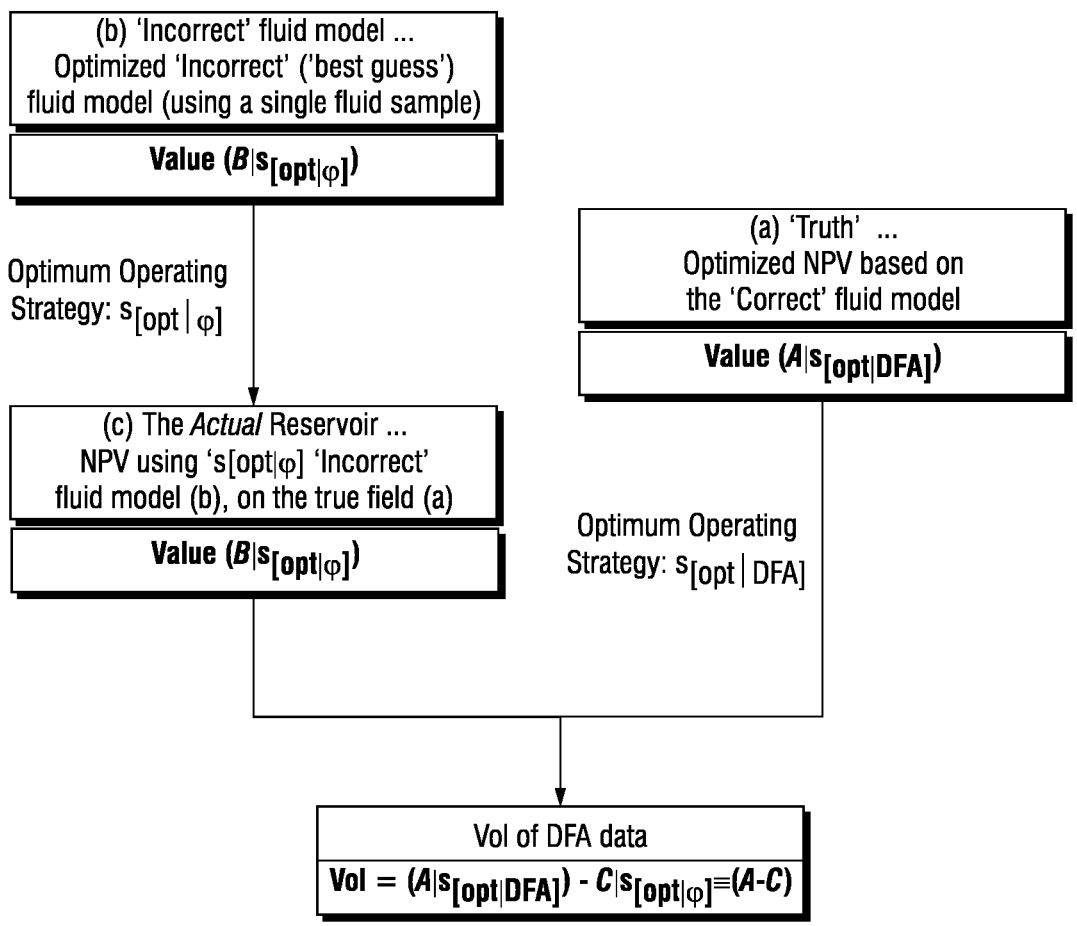
FIG. 5 is a schematic diagram of the workflow of FIGS. 4A and 4B.

FIG. 5 is a schematic diagram of the workflow of FIGS. 4A and 4B.

Figure 6A:
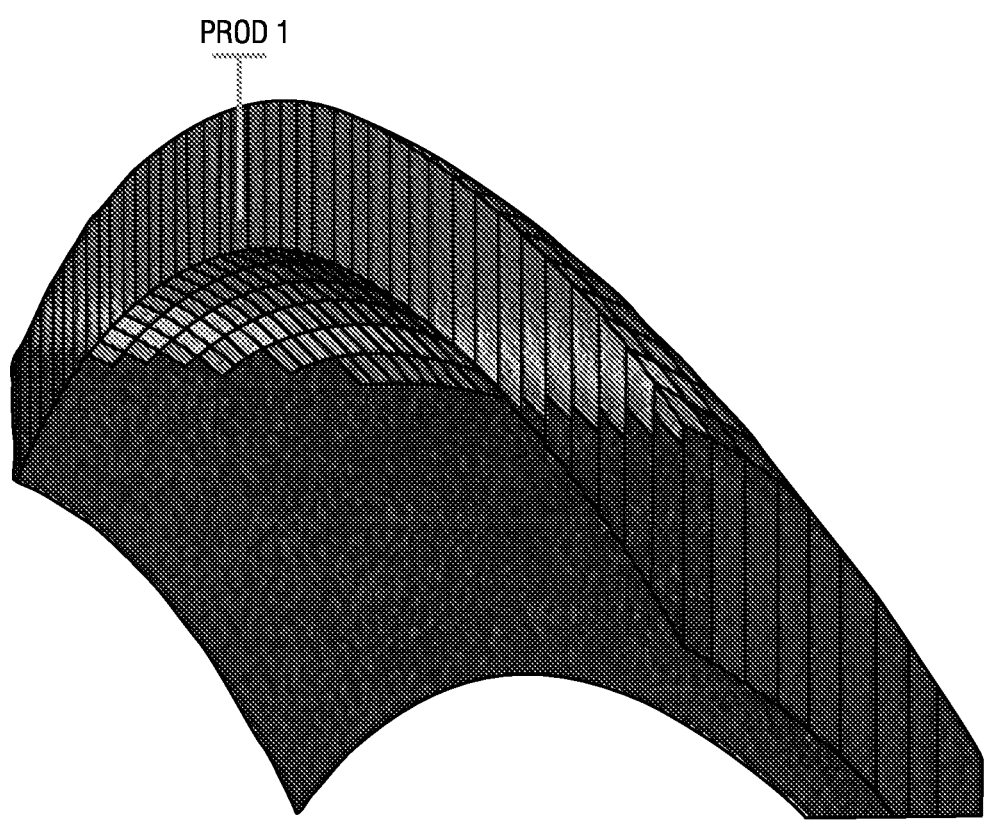
FIG. 6A is a cross-sectional view of a visual representation of a reservoir model for an exemplary hydrocarbon-bearing reservoir of interest.

FIG. 6A is a cross-sectional view of a visual representation of a reservoir model for an exemplary hydrocarbon-bearing reservoir of interest. The reservoir model reflects the exemplary hydrocarbon-bearing reservoir, which has a dome shape with a single production well near to its crest as shown. The reservoir model also includes the properties specified in table C below.

TABLE C

| Pay Zone | 400 ft from crest, at 15,000 ft (True Vertical Depth or TVD) |
|---|---|
| Oil water Contact | 15,400 ft (TVD) |
| Porosity | 17.5% |
| Pressure (at 15,000 ft TVD) | 7000 psi |
| Horizontal Permeability, $k_{H(x-y)}$ | 125 mD |
| Vertical Permeability, $k_{V(z)}$ | $k_{V(z)} = 0.1 \times k_{H(x-y)}$ in mD |
| Net-to-Gross | 75.0% |
| Analytic Aquifer Model | Carter-Tracey type |
| Initial Water Saturation, $(S_{wat})_{init}$ | 20% |
| Active Grid Cells | 16 × 40 × 25 (I × J × K) = 16,000 grid cells |

Figure 6C:
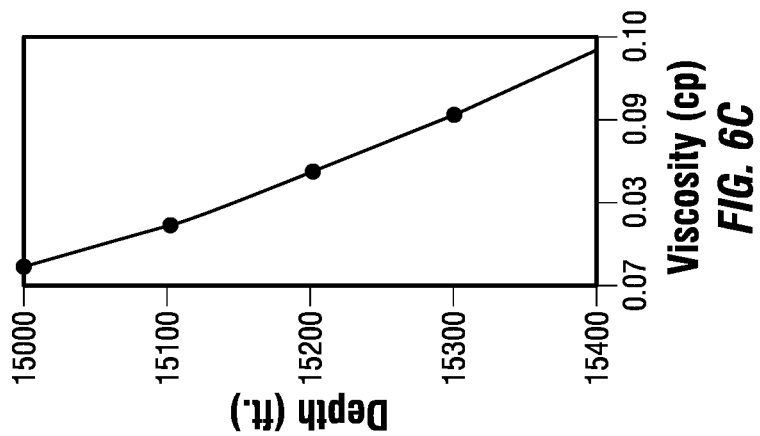
FIG. 6C is a plot of the fluid viscosity gradient of the reservoir fluids that can be incorporated into the reservoir model of FIG. 6A.
Figure 6B:
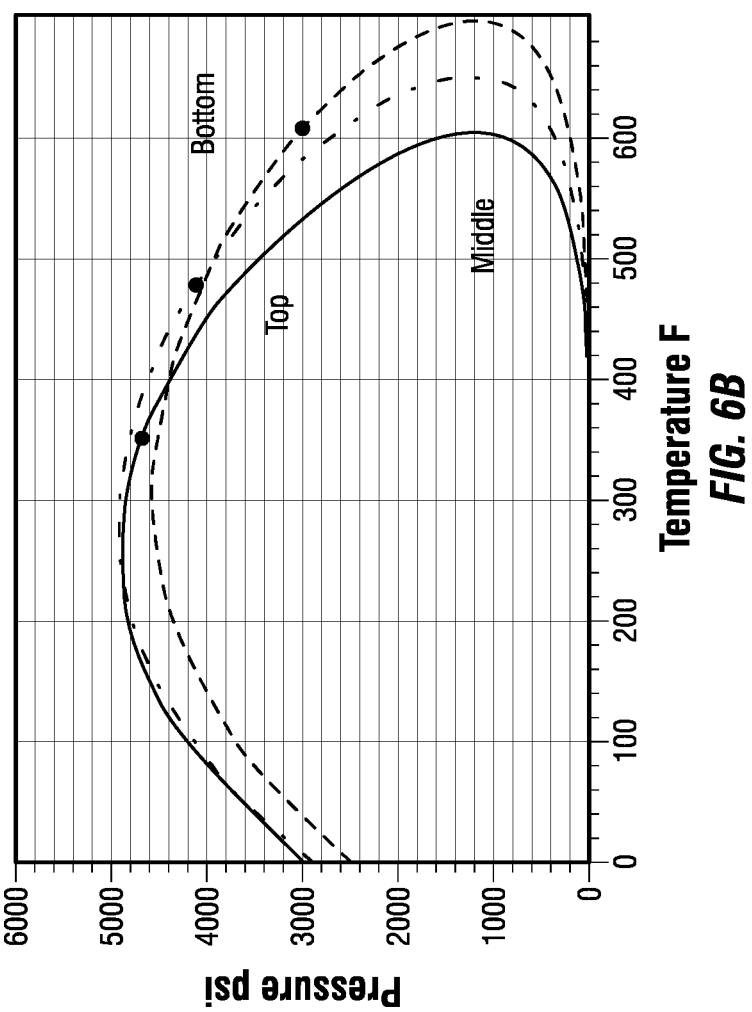
FIG. 6B are plots of the phase envelope for three fluid models that can be incorporated as part of the reservoir model of FIG. 6A; the three fluid models are derived from three distinct single station fluid samples.

FIG. 6B are plots of the phase envelope for three fluid models that can be incorporated into the reservoir model of FIG. 6A and Table C. The three fluid models are derived from three distinct single station fluid samples, which include a "Top" fluid sample from 0 ft (TVD) from the crest of the reservoir, a "Middle" fluid sample from 200 ft (TVD) from the crest of the reservoir, and a "Bottom" fluid sample at 400 ft (TVD). The critical values of the three phase enveloped of FIG. 6B are provided in Table D below.

TABLE D

| | Single Sample Points | | |
|---|---|---|---|
| Parameter | Top | Middle | Bottom |
| Cricondentherm (° F.) | 600 | 650 | 700 |
| Cricondenbar (psia) | 4,900 | 4,950 | 4,600 |
| Critical Point (T[° F.]/P[psia]) | 350/4,700 | 490/4,000 | 610/3000 |

FIG. 6C is a plot of the fluid viscosity gradient of the reservoir fluids that can be incorporated into the reservoir model of FIG. 6A and Table C.

Figure 6D:
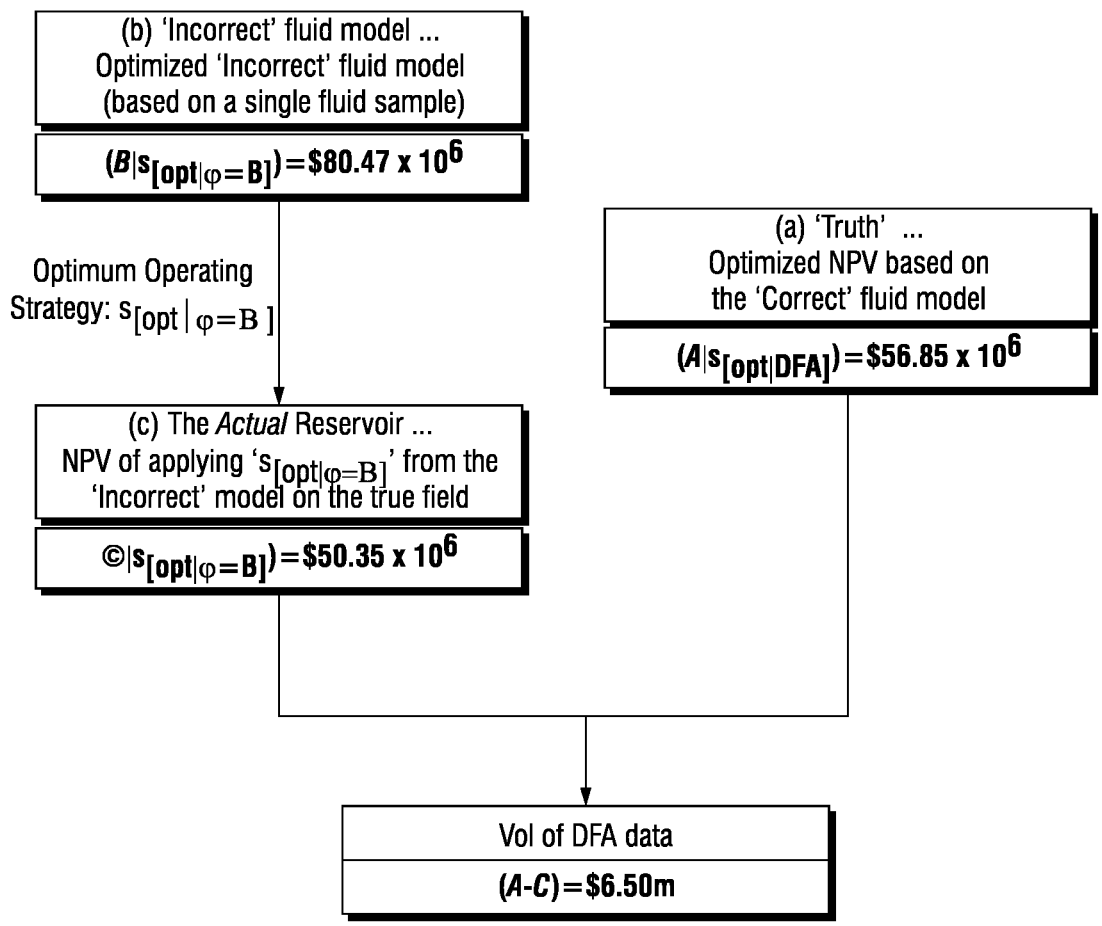
FIG. 6D is a schematic diagram that presents the results of the analysis of the workflow of FIGS. 4A and 4B and FIG. 5 for the reservoir model of FIG. 6A.

The reservoir model shows that the reservoir of interest has a Stock Tank Oil Initially In Place (STOIIP, stated in standard barrels, stb) that is around $11.25 \times 10^6$ stb (plus around $15.30 \times 10^9$ scf of gas yielding a GOR of around 1360 scf/stb), with a vertical 400-foot thick pay zone (as measured from its structural crest located at 15,000 ft [TVD]). The reservoir possesses a complex fluid with a clear compositional and viscosity gradient as evident from FIG. 6C. The phase envelope plots of FIG. 6B shows that there is a wide variation in the phase envelopes with cricondentherms and cricondenbars presented in Table D above. FIG. 6D is a schematic diagram that presents the results of the analysis of the workflow of FIGS. 4A and 4B and FIG. 5 for the reservoir model described above with respect to FIGS. 6A to 6C and Tables C and D with a single production well near to its crest. The reservoir simulation is carried out to forecast production over a 2-year period that then allows computation of a 2-year NPV—the objective function that is maximized by the workflow of FIGS. 4A and 4B and FIG. 5.

Figure 7A:
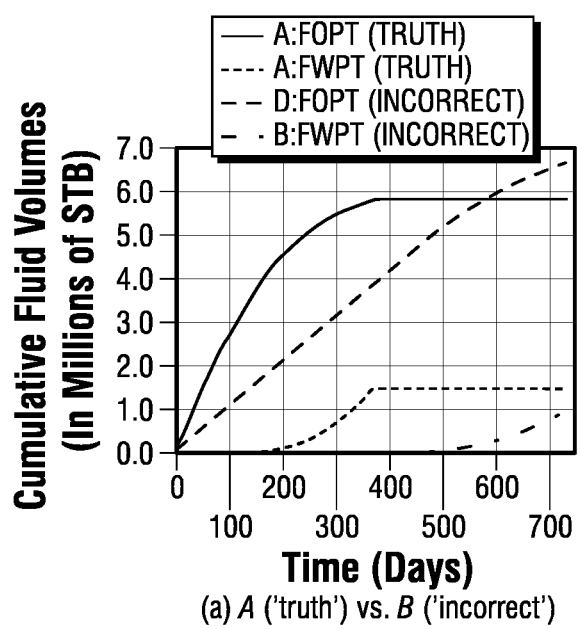
FIGS. 7A and 7B are plots that show the corresponding cumulative oil and water totals that are produced by workflow of FIGS. 4A and 4B and FIG. 5 for the reservoir model of FIGS. 6A to 6C and Tables C and D provided below.
Figure 7B:
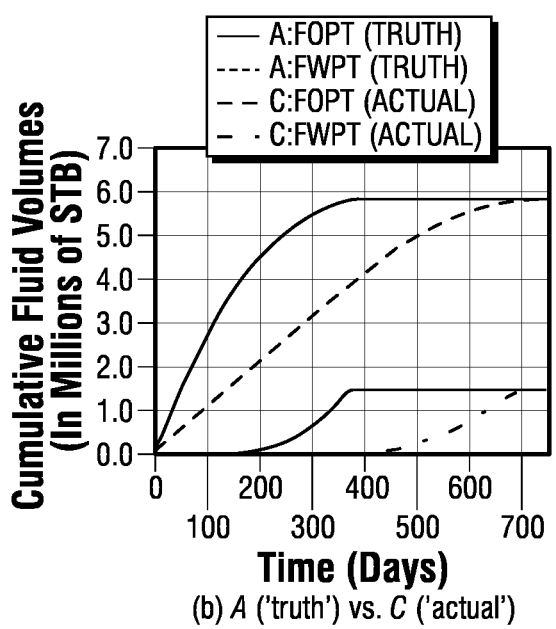

FIGS. 7A and 7B are plots that show the corresponding cumulative oil and water totals that are produced by workflow of FIGS. 4A and 4B and FIG. 5 for the reservoir model of FIGS. 6A-6C and Tables C and D. FIG. 7A are plots that show the corresponding cumulative oil and water totals for the simulation of step 415 (labeled A or truth) with the optimum operating control strategy $s_{[opt,DFA]}$ as compared to the simulation of step 407 (labeled B or incorrect) with the optimum operating control strategy $s_{[opt,\phi]}$. FIG. 7B are plots that show the corresponding cumulative oil and water totals for the simulation of step 415 (labeled A or truth) with the optimum operating control strategy $s_{[opt,DFA]}$ as compared to the simulation of step 409 (labeled C or actual) with the optimum operating control strategy $s_{[opt,\phi]}$. Note that curves labeled A terminate at around 380 days due to BHP hitting the target limit of 4000 psi.

FIG. 8 is a table that presents a suite of results that are produced by workflow of FIGS. 4A and 4B and FIG. 5 for the exemplary hydrocarbon-bearing reservoir of interest, considering three incorrect fluid models derived from the three single station samples (the "Top" sample, the "Middle" sample, and the "Bottom sample) along with their optimum set of control variables. The column labelled "VOI" reflects the VOI of the true fluid model which is calculated by subtracting the performance of the actual field $C|s[opt,\phi]$ or C from the performance of the true field $A|s_{[opt,DFA]}$ or A. The column labelled "Loss" reflects the perceived underperformance of the actual field, $C|s_{[opt,\phi]}$ or C, when judged against the optimized value $B|s_{[opt,\phi]}$ or B. In this example, the "Loss" is particularly acute for analysis pertaining to bottom sample, specifically a material difference of $30.12 million which is 62% of expected NPV of $80.47 million for the optimized value $B|s_{[opt,\phi]}$. Note that value of the "Loss"

is potentially quite harmful to the manager of the reservoir of interest as it may result in either over-booking of value and/or un-realistically high expectation of capability The use of the true fluid model derived from DFA tool data clearly mitigates the wide variation in expected value observed for the three single-station fluid samples. The ability to mitigate against unrealistic value expectations and volatility is another major benefit of using the DFA tool data. Clearly, if one has a priori knowledge of the best (most correct) single-station location, then the need for the DFA tool data is reduced. However, it is extremely unlikely that such precise a priori knowledge will be known. Thus, DFA and the resulting DFA tool data remains the best surety against unrealistic asset revenue booking.

The approach to VOI of a fluid model derived from DFA data with uncertainty is substantially different to that for deterministic VOI, even though this approach also utilizes optimization. The reason for the differences are threefold:
 when uncertainty exists, a utility function is used that is not a direct measure of the NPV as derived in the case of the deterministic approach;
 the results from the optimizations with uncertainty are essentially distributions, thus one cannot simply subtract one distribution from another; and
 the presentation and interpretation of the results may be problematic.

When uncertainty is brought into the analysis, the value of the fluid model derived from DFA data can no longer be accurately described by a single value as the results have a distribution. Instead, a "Figure-of-Merit" (FOM) can be introduced as an approximation (or 'proxy') to the desired VOI. The FOM has the general form:

$$F_\lambda = \mu_\lambda - \lambda \sigma_\lambda, \quad (4)$$

where $F_\lambda$ is the objective function for any user-specified value of risk aversion factor, $\lambda$, and $\mu_\lambda$ and $\sigma_\lambda$ are the mean and standard deviations of the objective function, respectively.

The relationship for quantifying the FOM using the objective function $F_\lambda$ as its basis, is given by:

$$VOI_{DFA} \approx FOM_F \equiv (F_{A|\lambda,s_{[opt,DFA]}} | F_{C|\lambda,s_{[opt,\phi]}} |). \quad (5)$$

Note that Eqn. (5) has a modulus around $F_{C|\lambda,s_{[opt,\phi]}}$. This is necessary to prevent the FOM at high values of $\lambda$ having a greater value than those with low values for $\lambda$; which would imply, erroneously, that one can obtain greater value from the DFA tool data the more risk averse one is—which is logically not correct. Such absurd values become manifest if $F_{C|\lambda,s_{[opt,\phi]}}$ is negative.

One could argue that instead of basing the FOM on the objective function of Eqn. (5), one could base it on the mean, $\mu_\lambda$, thus:

$$VOI_{DFA} \approx FOM_\mu \equiv (\mu_{A|\lambda,s_{[opt,DFA]}} - |\mu_{C|\lambda,s_{[opt,\phi]}}|) \quad (6)$$

The virtue of Eqn. (6) over Eqn. (5) is that it avoids the modulus and the mean value is (possibly) closer in magnitude to the likely asset performance. The downside of Eqn. (6) over Eqn. (5), however, is that it has no risk aversion component, $\lambda$, and it also ignores standard deviation, $\sigma$, which may be large. Note that both Eqns. (6) and (5) have some validity. However, Eqn. (5) is considered in the analysis below for consideration of risk aversion in the workflow. Other similar investigations employing Eqn. (6) can be performed as well if desired The first term $F_{A|\lambda, s_{[opt,DFA]}}$ of Eqn. (5) represents the objective function for the true fluid model (case A) generated in step 305 given a specified level of risk aversion factor $\lambda$ with an optimum control strategy $s_{[opt,DFA]}$. The second term $F_{C|\lambda,s_{[opt,\phi]}}$ of Eqn. (5) represents the objective function for the actual reservoir (case C) given a specified level of risk aversion factor $\lambda$ with the optimum control strategy $s_{[opt,\phi]}$ as suggested using the incorrect fluid model generated in step 303.

The optimum control strategy $s_{[opt,\phi]}$ identified from the incorrect fluid model of step 303 for each given risk aversion factor $\lambda$ of the second term $F_{C|\lambda,s_{[opt,\phi]}}$ of Eqn. (5) can be derived by optimizing the objective function $F_{B|\lambda,s_{[opt,\phi]}}$ given as:

$$F_{B|\lambda,s_{[opt,\phi]}} = \mu_{B|\lambda,s_{[opt,\phi]}} - \lambda \sigma_{B|\lambda,s_{[opt,\phi]}}, \quad (7)$$

where $F_{B|\lambda,s_{[opt,\phi]}}$ represents the objective function for the incorrect fluid model generated in step 303 given a specified level of risk aversion factor $\lambda$ with a control strategy $s_{[opt,\phi]}$,
 $\mu_{B|\lambda,s_{[opt,\phi]}}$ represents the mean of all realizations sampling all uncertainties for the incorrect fluid model generated in step 303 given a specified level of risk aversion factor $\lambda$ with the control strategy $s_{[opt,\phi]}$, and
 $\sigma_{B|\lambda,s_{[opt,\phi]}}$ represents the standard deviation of all realizations sampling all uncertainties for the incorrect fluid model generated in step 303 given a specified level of risk aversion factor $\lambda$ with the control strategy $s_{[opt,\phi]}$.

The term $F_{C|\lambda,s_{[opt,\phi]}}$ of Eqn. (5) can be derived from the optimum control strategy $s_{[opt,\phi]}$ for each given risk aversion factor $\lambda$ as:

$$F_{C|\lambda,s_{[opt,\phi]}} = \mu_{C|\lambda,s_{[opt,\phi]}} - \lambda \sigma_{C|\lambda,s_{[opt,\phi]}}, \quad (8)$$

where $F_{C|\lambda,s_{[opt,\phi]}}$ represents the objective function for the true fluid model generated in step 305 given a specified level of risk aversion factor $\lambda$ with a control strategy $s_{[opt,\phi]}$,
 where $\mu_{C|\lambda,s_{[opt,\phi]}}$ represents the mean of all realizations sampling all uncertainties for the actual reservoir (case C) based on the true fluid model generated in step 305 given the specified level of risk aversion factor $\lambda$ and corresponding optimum control strategy $s_{[opt,\phi]}$, and
 $\sigma_{C|\lambda,s_{[opt,\phi]}}$ represents the standard deviation of all realizations sampling all uncertainties for the actual reservoir (case C) based on the true fluid model generated in step 305 given the specified level of risk aversion factor $\lambda$ and corresponding optimum control strategy $s_{[opt,\phi]}$.

The optimum control strategy $s_{[opt,DFA]}$ identified from the true fluid model for each given risk aversion factor $\lambda$ of the first term $F_{A|\lambda,s_{[opt,DFA]}}$ of Eqn. (5) can be derived by optimizing the objective function $F_{A|\lambda,s_{[opt,DFA]}}$ given as:

$$F_{A|\lambda,s_{[opt,DFA]}} = \mu_{A|\lambda,s_{[opt,DFA]}} - \lambda \sigma_{A|\lambda,s_{[opt,DFA]}}, \quad (9)$$

where $F_{A|\lambda,s_{[opt,DFA]}}$ represents the objective function for the true fluid model generated in step 305 given a specified level of risk aversion factor $\lambda$ with a control strategy $s_{[opt,DFA]}$,
 $\mu_{A|\lambda,s_{[opt,DFA]}}$ represents the mean of all realizations sampling all uncertainties for the true fluid model generated in step 305 given a specified level of risk aversion factor $\lambda$ with the control strategy $s_{[opt,DFA]}$ and
 $\sigma_{A|\lambda,s_{[opt,DFA]}}$ represents the standard deviation of all realizations sampling all uncertainties for the true fluid model generated in step 305 given a specified level of risk aversion factor $\lambda$ with the control strategy $s_{[opt,DFA]}$.

Figure 9:
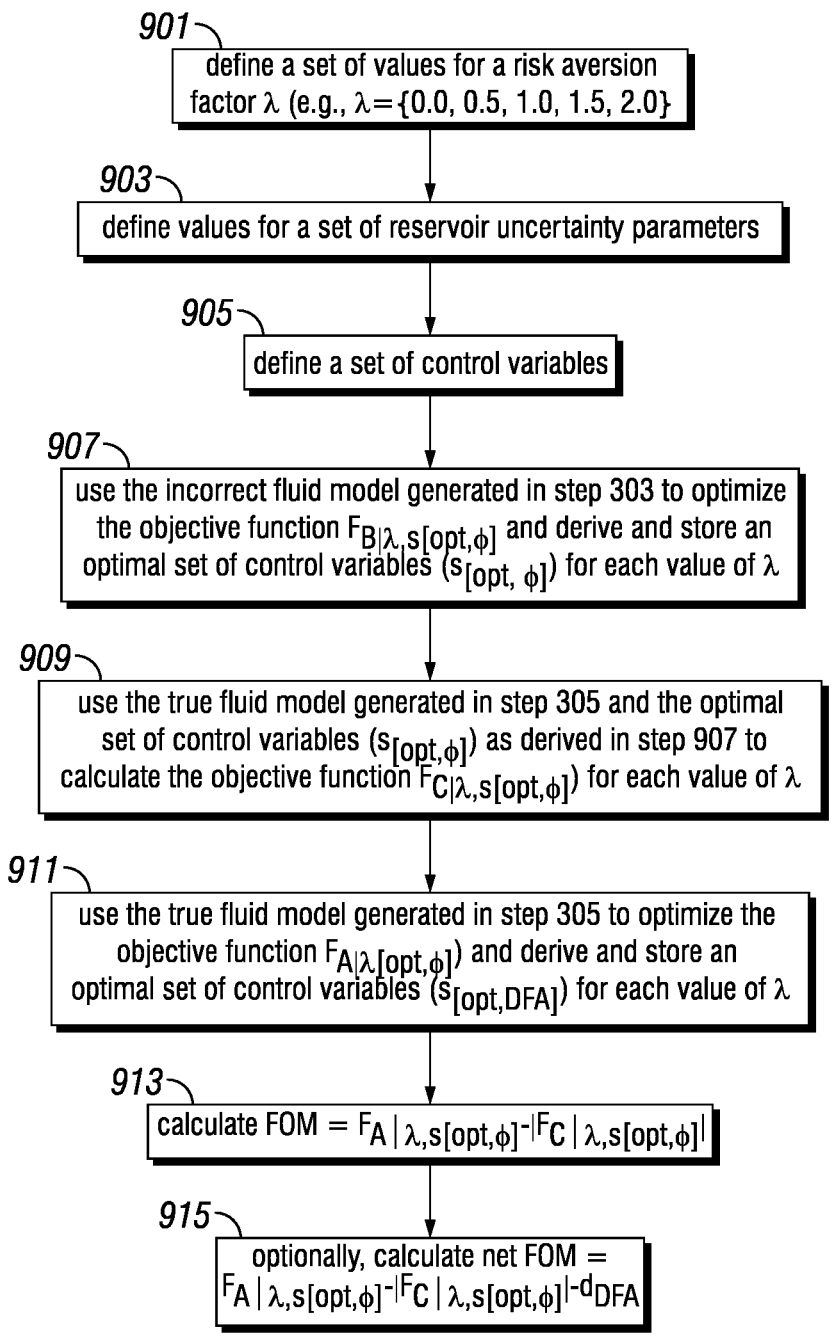
FIG. 9 is a flow chart that outlines a workflow to establish a Figure of Merit (i.e., VOI with uncertainty) for a fluid model derived from DFA tool data as compared to the value of a fluid model derived from a single-station fluid sample.

FIG. 9 illustrates the workflow for calculating the FOM of Eqn. (5) for a reservoir of interest. The operations begin in step 901 where a set of values for the risk aversion factor $\lambda$ are defined for the workflow. The set of values for the risk aversion factor λ can be selected by the user, fixed by system design or defined in some other manner. In step 903, a set of reservoir uncertainty parameters and associated values are defined for the workflow. The set of reservoir uncertainty parameters and their associated values can be selected by the user, fixed by system design or defined in some other manner. In step 905, a set of control variables and associated values (such as an initial guess, an upper limit and a lower limit) are defined for the workflow. An example of such control variables are described above with respect to table A.

In step 907, the incorrect fluid model generated in step 303 is used to optimize the objective function $F_{B|\lambda, s_{[opt,\phi]}}$ of Eqn. (7) to derive and store the optimum control strategy $s_{[opt,\phi]}$ for each value of the risk aversion factor λ as defined in step 901. These operations can include an outer loop over the values of the risk aversion factor λ defined in step 901. For each value of the risk aversion factor λ defined by the outer loop, an inner loop is performed that includes a number of different reservoir simulations based on the reservoir model for the reservoir of interest (which includes the incorrect fluid model of step 303 and the set of control variables defined in step 905). The number of different reservoir simulations use different combinations of the values of the reservoir uncertainty parameters as defined in step 903. The inner loop also calculates an NPV for each one of the number of different reservoir simulations. The results of the NPV calculations of the inner loop are processed to calculate the mean and standard deviation of such NPV results and the objective function $F_{B|\lambda, s_{[opt,\phi]}}$ is calculated according to Eqn. (7), which based on the mean and standard deviation of the NPV results for the given value of the risk aversion factor λ. The values of the control variables are then varied and the inner loop and subsequent data processing that calculates the objective function $F_{B|\lambda, s_{[opt,\phi]}}$ is repeated in order to maximize the objective function $F_{B|\lambda, s_{[opt,\phi]}}$. The optimal set of control variables for the given value of the risk aversion factor λ is given by the set of control variables for the optimized objective function $F_{B|\lambda, s_{[opt,\phi]}}$ and stored for subsequent access. Thus, the result of the outer loop of step 907 is an optimal set of control variables $s_{[opt,\phi]}$ for each one of the set of values for the risk aversion factor λ defined in step 901.

In step 909, the term $F_{C|\lambda, s_{[opt,\phi]}}$ of Eqn. (5) can be derived according to Eqn. (8) from the optimum control strategy $s_{[opt,\phi]}$ for each given risk aversion factor λ as generated and stored in step 907. These operations can include an outer loop over the values of the risk aversion factor λ defined in step 901. For each value of the risk aversion factor λ defined by the outer loop, an inner loop is performed that includes a number of different reservoir simulations based on the reservoir model for the reservoir of interest (which includes the true fluid model of step 305 and the optimal set of control variables $s_{[opt,\phi]}$ generated and stored in step 907). The number of different reservoir simulations use different combinations of values of the reservoir uncertainty parameters as defined in step 903. The inner loop also calculates an NPV for each one of the number of different reservoir simulations. The results of the NPV calculations of the inner loop are processed to calculate the mean and standard deviation of such NPV results and the objective function $F_{C|\lambda, s_{[opt,\phi]}}$ is calculated according to Eqn. (8), which based on the mean and standard deviation of the NPV results for the given value of the risk aversion factor λ. Thus, the result of the outer loop of step 909 is the calculation of the objective function $F_{C|\lambda, s_{[opt,\phi]}}$ for each one of the set of values for the risk aversion factor λ defined in step 901.

In step 911, the true fluid model generated in step 305 is used to optimize the objective function $F_{A|\lambda, s_{[opt,DFA]}}$ of Eqn. (9) to derive and store the optimum control strategy $s_{[opt,DFA]}$ for each value of the risk aversion factor λ as defined in step 901. These operations can include an outer loop over the values of the risk aversion factor λ defined in step 901. For each value of the risk aversion factor λ defined by the outer loop, an inner loop is performed that includes a number of different reservoir simulations based on the reservoir model for the reservoir of interest (which includes the true fluid model of step 305 and the set of control variables defined in step 905). The number of different reservoir simulations use different combinations of values of the reservoir uncertainty parameters as defined in step 903. The inner loop also calculates an NPV for each one of the number of different reservoir simulations. The results of the NPV calculations of the inner loop are processed to calculate the mean and standard deviation of such NPV results and the objective function $F_{A|\lambda, s_{[opt,DFA]}}$ is calculated according to Eqn. (9), which based on the mean and standard deviation of the NPV results for the given value of the risk aversion factor λ. The values of the control variables are then varied and the inner loop and subsequent data processing that calculates the objective function $F_{A|\lambda, s_{[opt,DFA]}}$ is repeated in order to maximize the objective function $F_{A|\lambda, s_{[opt,DFA]}}$. The optimal set of control variables for the given value of the risk aversion factor λ is given by the set of control variables for the optimized objective function $F_{A|\lambda, s_{[opt,DFA]}}$ and stored for subsequent access. Thus, the result of the outer loop of step 911 is an optimal set of control variables $s_{[opt,DFA]}$ and corresponding optimized value of the objective function $F_{A|\lambda, s_{[opt,DFA]}}$ for each one of the set of values for the risk aversion factor λ defined in step 901.

In step 913, the FOM that characterizes the value of the true fluid model with uncertainty is calculating according to Eqn. (5), where, for each value of the risk aversion factor λ, the absolute value of second term $F_{C|\lambda, s_{[opt,\phi]}}$ as generated and stored in step 909 is subtracted from the first term $F_{A|\lambda, s_{[opt,DFA]}}$ as generated and stored in step 911.

In optional step 915, if the additional cost of obtaining the DFA data is given as $d_{DFA}$, then the net FOM can be calculated for each value of the risk aversion factor λ by subtracting both $d_{DFA}$ and the absolute value of second term $F_{C|\lambda, s_{[opt,\phi]}}$ as generated and stored in step 909 from the first term $F_{A|\lambda, s_{[opt,DFA]}}$ as generated and stored in step 911.

Figures 10, 11:
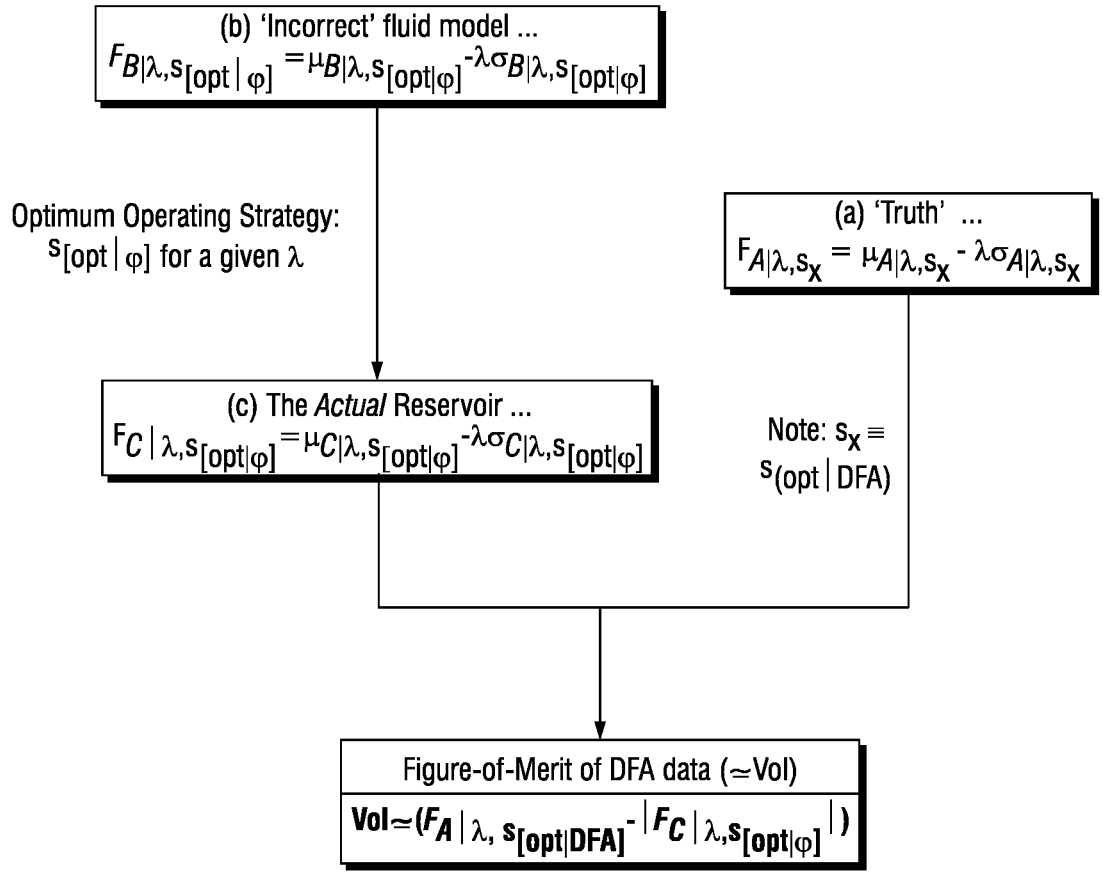

FIG. 10 is a schematic diagram of the workflow of FIG. 9.

FIGS. 11, 12, 13A, 13B and 14 are diagrams that present the results of the analysis of the workflow of FIGS. 9 and 10 for the reservoir model of FIGS. 6A to 6C and Tables C and D with a single production well near to its crest. The reservoir simulation is carried out to forecast production over a 2-year period that then allows computation of a 2-year FOM that characterizes the value of the true fluid model with uncertainty. In this example, the risk aversion factor λ has values belonging to the set {0.0, 0.5, 1.0, 1.5, 2.0}, and two independent physical uncertainties are considered as shown in table E below.

TABLE E

| | Sample Values | | |
|---|---|---|---|
| Uncertainty Parameter | Low | Mid | High |
| Oil-Water Contact, OWC (ft in total vertical depth) | 15,350 | 15,400 | 15,450 |
| Perm Multiplier - used to derive change in permeability along the vertical direction of the reservoir | 0.9 | 1.0 | 1.1 |

In this example, the two uncertainty parameters are each sampled with three equi-probable sampling points. Thus, every optimization trial, T, requires the following number of realizations (separate calls to the reservoir simulator):

$$\prod_{j=1}^{N_{unc}} m_j = \prod_{j=1}^{2} 3_j = 9 \quad (11)$$

where N, represents the number of uncertainties in the problem (here, we have 2), and
each uncertainty has m sample points (in this case, 3 equi-probable samples).

FIG. 11 presents the results for $F_{A|\lambda,S_{[opt,DFA]}}$ for the true fluid model with uncertainty. The 'Conf.' column represents the degree of confidence associated with its corresponding value of risk aversion factor $\lambda$, where it is assumed that all outcomes are normally distributed. The control variables of the analysis are those described above with respect to Table A, and their respective units.

Figure 12:
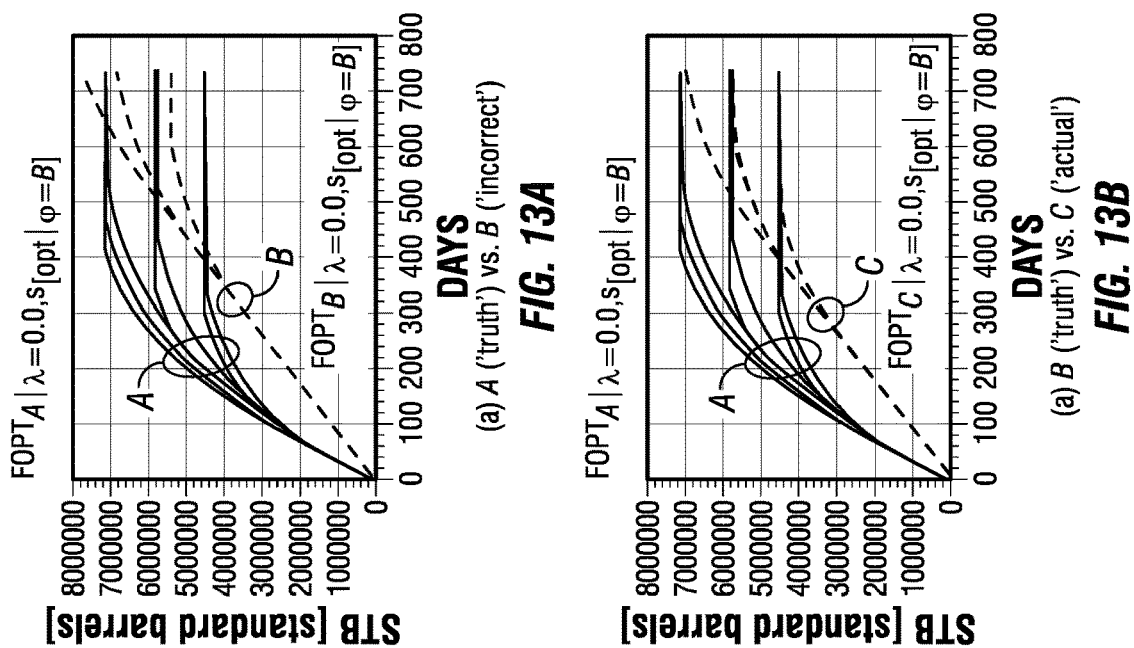

FIG. 12 presents the suite of results for three incorrect fluid models derived from three single-station samples and the values of FOM for various values of the of risk aversion factor $\lambda$. The control variables of the analysis are those described above with respect to Table A, and their respective units.

FIGS. 13A and 13B are curves showing the values for the simulated Field Oil Production Total (cumulative oil) or FPOT in standard barrels (STB) for the cases A, B and C for all 9 realizations of the reservoir uncertainty for the risk aversion factor $\lambda$=0.0 where the incorrect fluid model is derived from a bottom fluid sample. In FIG. 13A, each curve represents one realization for A ('truth') vs. B ('incorrect'). In FIG. 13B, each curve represents one realization for A ('truth') vs. C ('actual'). Note that curves for case 'B' are typically overly optimistic (suggesting higher FOPT) while the curves in group C furnishes the actual production (reduced FOPT).

Figure 14:
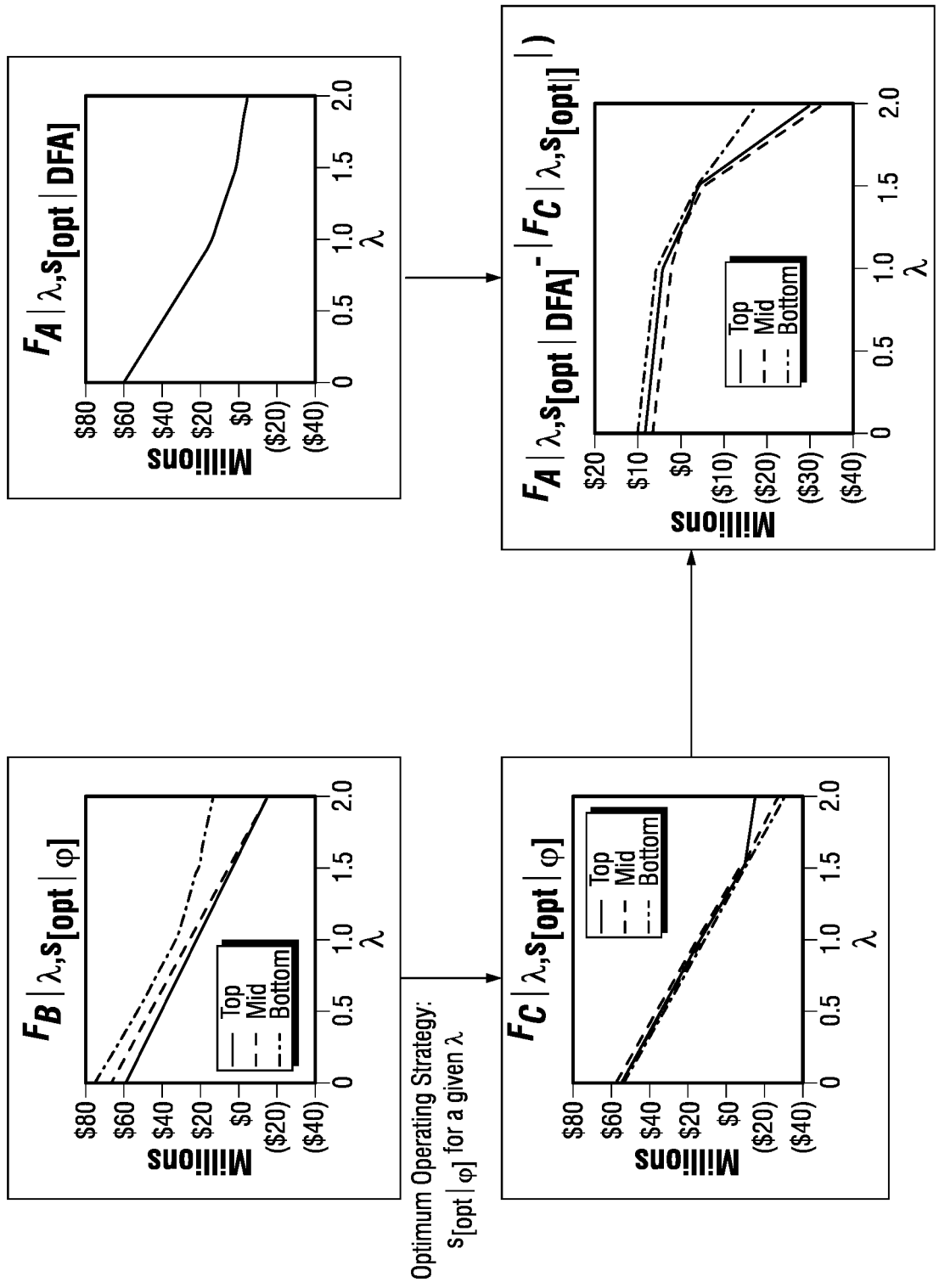

FIG. 14 is a plot of the results of FIG. 12 and follows the workflow of FIGS. 9 and 10. The upper-left box represents the results of the processing of step 907 ($F_{B|\lambda,S_{[opt,\phi]}}$) for the various values of the of risk aversion factor $\lambda$. The lower-left represents the results of the processing of step 909 ($F_{C|\lambda,S_{[opt,\phi]}}$) for the various values of the of risk aversion factor $\lambda$. The upper-right box represents the results of the processing of step 911 ($F_{A|\lambda,S_{[opt,DFA]}}$) for the various values of the of risk aversion factor $\lambda$. The lower-right represents the results of the processing of step 913 (the FOM) for the various values of the of risk aversion factor $\lambda$. The value of $F_{B|\lambda,S_{[opt,\phi]}}$ for the upper-left box, the value of $F_{C|\lambda,S_{[opt,\phi]}}$ for the lower-left plot, and the value of $F_{A|\lambda,S_{[opt,DFA]}}$ for the upper-right plot require some interpretation and in all instances are derived from the mean and standard deviations of all nine realizations of the reservoir simulation. For example, in the upper-right plot of FIG. 14, the value for $F_{A|\lambda=1.5} = (\mu_{A|\lambda=1.5} - 1.5\sigma_{A|\lambda=1.5}) = (27.26 - 1.5 \times 15.38) = 4.14$. Note that all values are stated in US\$×10⁶. This result may be interpreted as "There is a 93.3% likelihood that the mean asset value ($\mu$) of the reservoir will be \$27.26×10⁶ or more." However, for the case of severe risk aversion, i.e. $\lambda$=2.0, then $F_{A|\lambda=2.0} = (\mu_{A|\lambda=2.0} - 2.0\sigma_{A|\lambda=2.0}) = (19.44 - 2.05 \times 10.93) = -2.42$. This is interpreted as: "There is a 97.7% likelihood that the mean asset value ($\mu$) of the reservoir will be \$19.44×10⁶ or more." In other words, there is a trade-off between a higher mean and a reduced standard deviation (increased certainty). Note that the fact that $F_{A|\lambda=2.0}$ is negative here is not an indication that the true fluid model will deliver negative value. Recall that the objective function F is a utility function, a derived optimized quantity, which is not directly correlated with asset revenue. In other words, the objective function F is not a realizable NPV. The fact that it is negative should not be off-putting—rather it should be used as a guide in determining the potential value of the true fluid model derived from DFA tool data.

The bottom-right plot in FIG. 14 provides one important piece of information, namely the degree of certainty at which the true fluid model will yield increased value over the alternative given the two reservoir uncertainties considered. If we assume a normal distribution for all outcomes, then the point along the x-axis where the curve crosses the \$0 value provides an estimate of the degree of certainty that the true fluid model will deliver superior value to the asset (the client). For example, the curve for results where the incorrect fluid model is derived from the "Middle" sample crosses at the point where the risk aversion factor $\lambda$ is about 1.2 which corresponds to a certainty equivalent of 88.5%. In other words, there is an 88.5% likelihood that the true fluid model based on DFA tool data will deliver superior value over the incorrect fluid model based on the single-station "Middle" fluid sample. Likewise, the curve for results where the incorrect fluid model is derived from the "Top" sample crosses at the point where the risk aversion factor $\lambda$ is about 1.23 which corresponds to a certainty equivalent of 89.1% likelihood. And the curve for results where the incorrect fluid model is derived from the "Bottom" sample crosses at the point where the risk aversion factor $\lambda$ is about 1.33 which corresponds to a certainty equivalent of 90.1% likelihood. It is worth restating that the actual values of the objection functions F presented in FIG. 14 are figure-of-merits and not explicit values of NPV. However, these values do provide inference and confirmation that the true fluid model based on DFA tool data will provide superior value in roughly 90% of cases for the reservoir uncertainties considered. Clearly, the larger the value of the risk aversion factor $\lambda$ where the 'cross-over' happens, the greater the likelihood that true model based on DFA tool data will deliver the desired improvement.

FIG. 15A presents a visual representation called a "Regret Plot" that is useful for interpreting the results of the workflow of FIGS. 9 and 10. The Regret Plot is presented in quadrants of (roughly) equal magnitude, labelled 'A', 'B', 'C' and 'D' with the origin at its center. The y-axis represents the optimized NPV's for case A (step 911). The x-axis represents the difference in NPV, for each realization and each value of the risk aversion factor $\lambda$, between the optimized NPV's for case A (step 911) and the optimized NPV's for case C (step 909) as follows:

$$(\Delta NPV)_{r,\lambda} = (NPV_A)_{r,\lambda} - (NPV_C)_{r,\lambda}, \quad (12)$$

where r represents each possible realization of the uncertainty space being sampled (see Table E above).

Interpretation of the "Regret Plot" of FIG. 15A is shown in the table of FIG. 15B, where the regions and labels correspond to those in FIG. 15A. If all {or most} results fall in quadrant 'A', then the true model based on the DFA tool data will be preferred over the alternative. If some realizations fall in other quadrants, it is up to the decision maker to determine the appropriate course of action. We are not considering here any form of FOM or utility function. The values presented are simply each separate NPV for each individual realization. The location of our points provides a visual cue as to the potential benefit of the true fluid model based on the DFA tool data over the alternative. The plot of FIG. 15A can be generated by a computer processing system (such as the workstation of FIG. 3B) and output for visual rendering on a computer display device or possibly output in a form suitable for printing on a printer.

One should note that there are more points plotted in FIG. 15A (for each single-station fluid sample) than just the 9 uncertainty realizations. This is because the reservoir simulator was run for five different values of the risk aversion factor $\lambda$ (i.e., the set {0.0, 0.5, 1.0, 1.5, 2.0). Consequently, 9 values of NPV per each one of the five values of the optimized risk aversion factor $\lambda$ were computed by the reservoir simulator. However, some of these NPV's are identical to others as their computed values were the same, hence we actually observe fewer than 45 NPV's on the plot. Note that the preferred quadrant for the true fluid model 'A' which means that the true fluid model based on the DFA tool data not only makes money but makes more money than the alternative (i.e., the single-station fluid samples). We note from this figure that all points lie in our preferred quadrant. For completeness, the results are based on the three single-stations fluid samples (the "Top", "Middle" and "Bottom" fluid samples). While some points lie very close to the vertical zero-line, all points indeed lie to the right of this line and, therefore, all instances where the true fluid model is compared against the alternative, the true fluid model based on the DFA tool data is preferred.

It is also contemplated that, if the additional cost of obtaining the DFA data is given as $d_{DFA}$, then the values of the "Regret Plot" can be calculated as:

$$(\Delta NPV)_{r,\lambda} = (NPV_A)_{r,\lambda} - (NPV_C)_{r,\lambda} - d_{DFA}, \quad (13)$$

Although several example embodiments have been described in detail above, those skilled in the art will readily appreciate that many modifications are possible in the example embodiments without materially departing from the scope of this disclosure. Accordingly, all such modifications are intended to be included within the scope of this disclosure.

What is claimed is:

1. A method for preparing for a hydrocarbon-recovery operation based at least in part on a derived value of a hydrocarbon-bearing reservoir fluid model, the method comprising:

obtaining a first reservoir fluid sample from a reservoir using a single station sampling methodology at a single sampling station;

performing fluid analysis at the surface on the first reservoir fluid sample to obtain a first set of one or more fluid properties;

obtaining a plurality of second fluid samples of reservoir fluid using a downhole fluid analysis tool, wherein the plurality of second fluid samples are obtained from multiple locations within the reservoir, and wherein in situ downhole fluid analysis is performed on the plurality of second fluid samples to obtain a second set of one or more fluid properties; and using a processor to:
i) determine a first fluid model that describes properties of the reservoir as a function of location within the reservoir, wherein determining the first fluid model comprises extrapolating the first set of one or more fluid properties of the first reservoir fluid sample to generate a first fluid model that characterizes the properties of the reservoir as a function of depth;
ii) determine a second fluid model that describes the properties of the reservoir as a function of location within the reservoir, wherein determining the second fluid model comprises extrapolating the second set of one or more fluid properties obtained from the analysis of the plurality of second fluid samples to generate a second fluid model that characterizes the properties of the reservoir as a function of depth;
iii) simulate a first production of reservoir fluids from the reservoir using a reservoir simulator configured with the first fluid model of and a set of control variables, and calculate at least one first net present value ($NPV_1$) of the first production of the reservoir fluids simulated by the reservoir simulator;
iv) derive optimal values for the set of control variables of iii) by maximizing a first objective function associated with the first fluid model;
v) simulate a second production of the reservoir fluids from the reservoir using the reservoir simulator configured with the second fluid model and the optimal values of the set of control variables as derived in iv), and calculate at least one second net present value ($NPV_C$) of the second production of the reservoir fluids simulated by the reservoir simulator; and
vi) output information that characterizes value of the second fluid model based at least in part on the at least one second $NPV_C$ and calculations involving a second objective function associated with the second fluid model.

2. The method according to claim 1, wherein the calculations involving the second objective function comprise:
vii) simulating a third production of the reservoir fluids from the reservoir based on the reservoir simulator configured with the second fluid model and the set of control variables of iii), and calculating at least one third net present value $NPV_3$ of the third production of the reservoir fluids simulated by the reservoir simulator; and
viii) derive second optimal values for the set of control variables of vii) by maximizing the second objective function associated with the second fluid model.

3. The method according to claim 2, wherein the first objective function and the second objective function are deterministic in nature and do not take into account uncertainty.

4. The method according to claim 3, wherein:
the first objective function is based, at least in part, on the at least one first $NPV_1$ of the first production of the reservoir fluids simulated by the reservoir simulator in iii); and
the second objective function is based, at least in part, on the at least one second $NPV_C$ of the second production of reservoir fluids simulated by the reservoir simulator in v.

5. The method according to claim 2, wherein the first objective function and the second objective function take into account uncertainty.

6. The method according to claim 5, further comprising:
defining a set of uncertainty parameters and corresponding values for use in the reservoir simulations of iii), v), and vii).

7. The method according to claim 6, wherein:
the at least one first $NPV_1$ comprises a first plurality of net present values, and the first objective function is based on a first portion of the first plurality of net present values of the first production simulated by the reservoir simulator in iii) for a number of different combinations of values of the set of uncertainty parameters;
the at least one second $NPV_C$ comprises a second plurality of net present values, and the second objective function is based on a second portion of the second plurality of net present values of the second production simulated by the reservoir simulator in v) for the number of different combinations of values of the set of uncertainty parameters.

8. The method according to claim 7, wherein the calculations involving the second objective function comprise calculating a figure of merit based on results of the second objective function and the at least one second $NPV_C$.

9. The method according to claim 7, wherein:
the first objective function is based on first statistics of the first portion of the first plurality of net present values of the first production simulated by the reservoir simulator in iii); and
the second objective function is based on second statistics of the second portion of the second plurality of net present values of the second production simulated by the reservoir simulator in v.

10. The method according to claim 9, wherein:
the first statistics of the first objective function are selected from a first group comprising a first mean and a first standard deviation of the first portion of the first plurality of net present values of the first production simulated by the reservoir simulator in iii); and
the second statistics of the second objective function are selected from a second group comprising a second mean and a second standard deviation of the second portion of the second plurality of net present values of the second production simulated by the reservoir simulator in v.

11. The method according to claim 7, wherein:
the first objective function and the second objective function each have multiple instances based on different values of a risk aversion factor.

12. The method according to claim 11, wherein:
the first objective function and the second objective function each have the form $$F_\lambda = \mu_\lambda - \lambda \sigma_\lambda,$$

where $F_\lambda$ is the objective function for the different values of the risk aversion factor, $\lambda$, and $\mu_\lambda$ and $\sigma_\lambda$ are means and standard deviations of the objective function, respectively, for the different values of the risk aversion factor, $\lambda$.

13. A method for preparing for a hydrocarbon-recovery operation, the method comprising:
obtaining a plurality of first fluid samples from within a wellbore of a reservoir at a single measuring station;
performing a first fluid analysis outside the wellbore on the plurality of fluid samples to determine a first set of one or more fluid properties;
obtaining a plurality of second fluid samples using a downhole fluid analysis tool, wherein the plurality of second fluid samples are obtained from multiple locations with the reservoir, and wherein in situ downhole fluid analysis is performed on the plurality of second fluid samples to determine a second set of one or more fluid properties; and
using a processor to:
i) determine a first fluid model that describes properties of the reservoir as a function of location within the reservoir, wherein determining the first fluid model comprises extrapolating the first set of one or more fluid properties to generate the first fluid model that characterizes the properties of the reservoir as a function of depth;
ii) determine a second fluid model that describes the properties of the reservoir as a function of location within the reservoir, wherein determining the second fluid model comprises extrapolating the second set of one or more fluid properties to generate the second fluid model that characterizes the properties of the reservoir as a function of depth;
iii) determining a first group of optimal values of a set of control variables, wherein the first group of optimal values maximize a first objective function associated with at least one first net present value of a first production simulated by a reservoir simulator configured with the first fluid model; and
iv) calculate information that characterizes value of the second fluid model based on the evaluation of a second objective function and a third objective function, wherein:
the second objective function is associated with at least one second net present value of a second production simulated by the reservoir simulator configured with the second fluid model and the first group of optimal values;
the third objective function is based on at least one third net present value of a third production simulated by the reservoir simulator configured with the second fluid model and a second group of optimal values of the set of control variables; and
the second group of optimal values maximize the third objective function of the second fluid model.

14. The method according to claim 13, wherein:
the first objective function, the second objective function, and the third objective function are deterministic in nature and do not take into account uncertainty.

15. The method according to claim 13, wherein:
the first objective function, the second objective function, and the third objective function include statistics that account for uncertainty.

16. The method according to claim 15, wherein:
the statistics relate to results of reservoir simulations that employ different combinations of values for a set of uncertainty parameters.

17. The method according to claim 15, wherein:
the calculation of iv) involves calculating a figure of merit based on results of the second objective function and results of the third objective function.

18. The method of claim 13, wherein calculating the information that characterizes the value of the second fluid model comprises calculating a difference between the second objective function and the third objective function.

* * * * *